United States Patent
Li et al.

(10) Patent No.: US 12,444,729 B2
(45) Date of Patent: Oct. 14, 2025

(54) PREPARATION OF LI AND NA FOILS WITH {110} OR {100} SURFACE TEXTURING

(71) Applicant: The Chinese University of Hong Kong, Hong Kong (CN)

(72) Inventors: Quan Li, Hong Kong (CN); Xitao Hu, Shanxi (CN)

(73) Assignee: The Chinese University of Hong Kong, Hong Kong (CN)

( * ) Notice: Subject to any disclaimer, the term of this patent is extended or adjusted under 35 U.S.C. 154(b) by 174 days.

(21) Appl. No.: 18/149,378

(22) Filed: Jan. 3, 2023

(65) Prior Publication Data

US 2023/0231105 A1    Jul. 20, 2023

Related U.S. Application Data

(60) Provisional application No. 63/299,896, filed on Jan. 14, 2022.

(51) Int. Cl.
*H01M 4/04* (2006.01)
*B21B 1/40* (2006.01)
*B21D 33/00* (2006.01)
*H01M 4/38* (2006.01)

(52) U.S. Cl.
CPC ............ *H01M 4/0471* (2013.01); *B21B 1/40* (2013.01); *B21D 33/00* (2013.01); *H01M 4/0435* (2013.01); *H01M 4/381* (2013.01); *Y10T 29/30* (2015.01)

(58) Field of Classification Search
CPC .. H01M 4/0471; H01M 4/0435; H01M 4/381; H01M 4/0404; H01M 4/134; H01M 4/139; H01M 4/1393; H01M 4/1395; H01M 4/382; H01M 4/661; H01M 4/667; H01M 4/70; H01M 10/052; H01M 10/054; Y02E 60/10; B21B 1/40
See application file for complete search history.

(56) References Cited

U.S. PATENT DOCUMENTS

| | | | | |
|---|---|---|---|---|
| 7,455,935 B2 * | 11/2008 | Abe | ............. | H01M 10/052 429/337 |
| 7,807,294 B2 * | 10/2010 | Sato | ............. | H01M 4/0421 429/233 |
| 8,559,092 B2 * | 10/2013 | Bugno | ............. | G02F 1/1533 359/603 |
| 8,692,457 B2 * | 4/2014 | Aurongzeb | ............. | H10K 59/179 313/506 |
| 8,730,551 B2 * | 5/2014 | Neuman | ............. | B60R 1/088 359/603 |
| 8,878,882 B2 * | 11/2014 | Weller | ............. | G02B 6/0078 345/694 |
| 11,148,393 B2 * | 10/2021 | Sugamata | ............. | B32B 27/306 |
| 11,728,487 B2 * | 8/2023 | Archer | ............. | H01M 4/625 429/232 |
| 12,104,258 B2 * | 10/2024 | Balogh | ............. | H01M 4/0435 |
| 2004/0241553 A1 * | 12/2004 | Abe | ............. | H01M 6/181 429/337 |
| 2008/0020271 A1 * | 1/2008 | Sato | ............. | H01M 4/0428 429/231.95 |
| 2012/0153812 A1 * | 6/2012 | Aurongzeb | ............. | H10K 59/86 313/504 |
| 2012/0236387 A1 * | 9/2012 | Bugno | ............. | G02F 1/163 359/267 |
| 2013/0321496 A1 * | 12/2013 | Weller | ............. | G02B 6/0078 345/694 |
| 2014/0036337 A1 * | 2/2014 | Neuman | ............. | G02F 1/163 359/265 |
| 2016/0322632 A1 * | 11/2016 | Strunk | ............. | H01M 4/0471 |
| 2016/0380256 A1 * | 12/2016 | Stein | ............. | H01M 4/623 429/217 |
| 2017/0092955 A1 * | 3/2017 | Ashizawa | ............. | B30B 3/00 |
| 2019/0344535 A1 * | 11/2019 | Sugamata | ............. | B32B 27/306 |
| 2021/0257665 A1 * | 8/2021 | Muramatsu | ............. | H01M 10/0569 |
| 2022/0013769 A1 * | 1/2022 | Yamaguchi | ............. | H01M 4/134 |
| 2022/0045354 A1 * | 2/2022 | Kim | ............. | H01M 4/366 |
| 2022/0149378 A1 * | 5/2022 | Archer | ............. | H01M 4/134 |
| 2022/0223853 A1 * | 7/2022 | Liao | ............. | H01M 4/366 |
| 2022/0267886 A1 * | 8/2022 | Balogh | ............. | H01M 4/0435 |
| 2023/0146067 A1 * | 5/2023 | Yamaguchi | ............. | H01M 50/489 429/218.1 |
| 2023/0231105 A1 * | 7/2023 | Li | ............. | B21D 33/00 428/156 |
| 2023/0361309 A1 * | 11/2023 | Archer | ............. | H01M 4/625 |

* cited by examiner

*Primary Examiner* — Lawrence Averick
(74) *Attorney, Agent, or Firm* — SALIWANCHIK, LLOYD & EISENSCHENK

(57) ABSTRACT

A method of forming a lithium or sodium foil for use as an electrode involves imposing a surface texturing that is predominately the {110} or {100} crystallographic orientation. For a Li {110} foil, a raw foil with a thickness of about 600 μm is heated to about 90° C. to randomize the crystallographic orientation and the foil is rolled to about 300 μm upon cooling. The rolled film is then scraped of about 50 μm of the lithium surface and heated to about 75° C. and rolled a second time to about 200 μm, and again cooled to room temperature. The cooled foil can be shaped into the electrode. The electrode can be employed in a battery to greatly extend the life of the battery relative to a lithium battery with a lithium anode that lacks the surface texturing. The alkali metal can be lithium electrochemically deposited on 3D scaffold such as carbon cloth with the deposited alkali metal maintaining the {110} texture.

7 Claims, 40 Drawing Sheets

PREPARATION OF LI AND NA FOILS WITH {110} OR {100} SURFACE TEXTURING

CROSS-REFERENCE TO RELATED APPLICATION

This application claims the benefit of U.S. Ser. No. 63/299,896, filed Jan. 14, 2022, which is hereby incorporated by reference in its entirety including any tables, figures, or drawings.

BACKGROUND OF THE INVENTION

Lithium metal, a promising anode material for Li-based energy storage devices, has a high energy density (3861 mAh/g) and the lowest electrode potential (−3.04V vs SHE) among all anode candidates. However, a fundamental problem of Li-metal anode that limits its practical application as an anode is the growth of lithium dendrites upon repeated Li plating/stripping. The Li growth kinetics in combination with the inhomogeneity of the electrode surface promotes dendrite growth. The loose structure of the dendrites that are formed allows them to break from the electrode, leading to "dead lithium" while the remaining fractured Li surfaces continue to react with the electrolyte, consuming both Li and the electrolyte. Both processes result in a low Columbic efficiency and reduced cycle life. In addition, the sharp dendritic has the potential to pierce the battery separator, which can result in an internal short-circuit that can induce thermal runway in batteries, a serious safety concern.

Many strategies have been developed to suppress the growth of Li dendrites. Methods include: mechanically blocking the growth of lithium dendrites by using capping materials of high shear modulus; improving the Li nucleation uniformity by manipulating the architecture of the current collector, and modifying the anode surface or solid electrolyte interphases; and restricting the uneven Li growth by forming a high surface energy capping. Although these methods suppress the Li dendrite growth to certain extents, the problem persists and remains a major obstacle limiting the cycle performance of Li metal anode.

The effect of pristine Li texturing on Li dendrite growth and cycle performance of the electrode has not been examined. Texturing is the preferential crystallographic orientation rather than the specific surface topographical features formed in an engineering process. Because different crystalline planes are associated with different surface energies and surface diffusion energy barriers the texturing potentially affects the nucleation and growth of Li in a battery process. The texturing of Zn foils (0001) has been found to be beneficial for the long cycle performance of Zn-based batteries. Gu et al. have inferred from simulation results that the growth of Li on Cu (100) preferred to be along the [110] Li crystalline direction, Li plated on Cu (100) has shown a prolonged cycle life. Recently, Zhao et al. have demonstrated {110} texturing in Li films electroplated on Cu foil. With an ether electrolyte, such electrodes displays a 2500 min. cycle life in a symmetrical cell. The slow growth of Li along [110] crystalline direction was observed by Li et al.'s group when Li nanowire growth was examined using electron microscopy and it was discovered that Li can have a textured growth along [110] direction by using a specific electrolyte where the textured growth was associated with smooth termination surfaces. The direct use of Li foil as the anode does not require a pre-lithiation process in batteries with Li-free cathode (e.g., Li—S, etc.) In this regard, preparation of Li {100} texturing has been realized by the severe plastic deformation that occurs upon cold rolling of Li foil, which shows some improved electrochemical performance when working as the electrode. Nevertheless, a Li foil with {110} texturing is not available to date, and it is unknown whether this texturing can enhance its cycle performance.

BRIEF SUMMARY OF THE INVENTION

Embodiments of the invention are directed to a method of forming an alkali metal electrode where the electrode has a {110} or {100} surface texturing that is predominately the {110} or {100} texturing, the surface crystallographic orientation. A lithium or sodium metal foil is provided with a thickness of about 600 μm which undergoes as needed the first annealing to a first temperature of about 70 to 90 percent of the melting point of the alkali metal foil, such as about 90° C. for lithium or near room temperature for sodium. The annealing is maintained for about 1 to about 3 hours and cooling as needed to room temperature, wherein the alkali metal foil has a randomized surface crystallographic orientation. The surface of the foil is polished using a chemical polishing solution, such as a naphthalene tetrahydrofuran solution. The solution is then washed from the foil using a solvent, such as diethyl carbonate (DEC) or 1,3-dioxolane (DOL). For {110} texture, a first rolling is carried out at room temperature on the foil till the foil is about 300 μm in thickness. The surface is scrapped along the same axis as the first rolling such that about 50 μm in thickness is removed from the alkali metal foil at a temperature of about 70 percent of the melting point of the alkali metal foil, such as about 75° C. for lithium or room temperature for sodium. A second annealing is carried out at the same temperature for about 0.5 hours, and while maintaining this temperature, a second rolling of the alkali metal foil to about 200 μm in thickness. The foil is then cooled as needed and shaped into the electrode that consists essentially of a {110} surface texturing. The shape of the electrode can be round. To prepare Li or Na foils with {100} surface crystallographic orientation, pressing was carried out using a hydraulic press at room temperature. The pressure varied for different alkali metal, such as about 5 MPa for lithium or 3 MPa for sodium.

Another embodiment is directed to an alkali metal electrode where the alkali metal consists essentially of a {110} or {100} surface texturing on its surface. The alkali metal can be lithium or sodium where the {110} or {100} surface texturing is 95% or more of the surface before the first discharge of a battery in which it is included as the electrode.

Another embodiment of the invention is directed to a three dimensional (3D) alkali metal based current collector with {110} texture. The alkali metal can be lithium electrochemically deposited on 3D scaffold such as carbon cloth with the deposited alkali metal maintaining the {110} texture.

Another embodiment of the invention is directed to a battery that includes an alkali metal electrode consisting essentially of a {110} or {100} surface texturing. This lithium battery or sodium battery can employ the alkali metal as the electrode. In this manner the battery can cycle between discharging and charging many more times than that of an alkali metal battery with an alkali metal anode absent the {110} or {100} surface texturing before the first discharge of the battery.

DETAILED DISCLOSURE OF THE INVENTION

Embodiments of the invention are directed to the preparation of Li foils or Na foils that have a surface texturing of Li {110}, Li {100}, Na {110}, or Na {100}. No specific texturing is found in commercially available Li or Na foils before or after they are chemically polished. For comparison, applying a unidirectional pressure of 5.0 MPa perpendicular to the Li foil surface or 3 MPa perpendicular to the Na foil surface results in a {100} surface texturing of the Li foil and Na foil. Larger pressure promotes the formation of other surface texturing than {100}, consistent with the formation of surface texturing in metals having a body-centered cubic (BCC) structure. The thickness of the Li {100} surface texturing layer is estimated to be no less than 48.5 μm, and the preferential surface orientation is found to be stable when stored in the glove box at room temperature for 30 days or more.

The method of preparing the Li foil having {110} surface texturing according to an embodiment involves annealing a commercial lithium foil, typically, but not necessarily, with a diameter of about 16 mm and a thickness of about 600 μm at 90° C. for 2 hours before being cooled down to room temperature. This step removes any surface texturing that pre-exists in the Li foil and randomizes the surface crystallographic orientation. The surface of the commercial Li foil is cleaned by polishing. The polished samples are subjected to a first rolling at room temperature, for example, to about 300 μm in thickness. A surface layer of about, but not necessarily, 50 μm-thick is removed by scraping with a blade where the direction of scraping is the rolling direction. The scraped lithium foils are annealed, for example, at 75° C. for 30 min, and a second rolling is carried out to 200 μm in thickness at this elevated temperature. To complete an electrode of Li, the lithium foil is cooled to room temperature and cut into a round shape, for exemplary embodiments of about 12 mm diameter. Na foils with {110} surface texturing do not require a temperature of annealing or the second rolling above room temperature, though otherwise is carried out analogously to the method for Li foils with {110} texturing. As used herein, the term annealing is used with respect to a holding process at a temperature at which the desired surface texturing is observed after that process and the annealing does not necessarily require an elevated temperature as is typical with common annealing processes where heat promotes a relaxation or other structural change. Hence, a hold at room temperature can be referred to as annealing herein if the desired surface texture has been achieved.

Figure 1A:
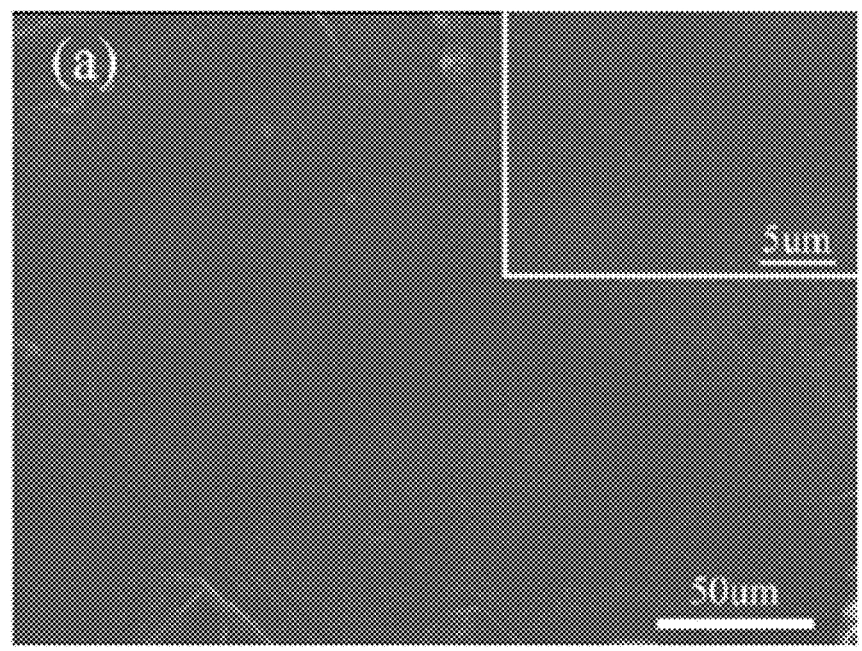
FIG. 1A is a SEM image of a typical Li foil with surface preparation.
Figure 1B:
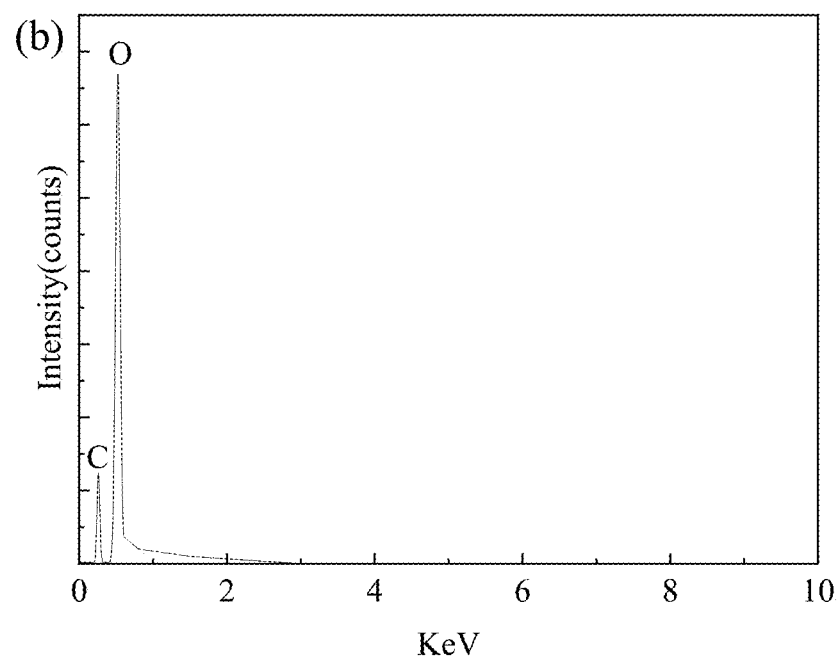
FIG. 1B shows an energy dispersive X-ray (EDX) spectrum taken from the sample shown in FIG. 1A, suggesting the surface is rich in O and C.
Figure 1C:
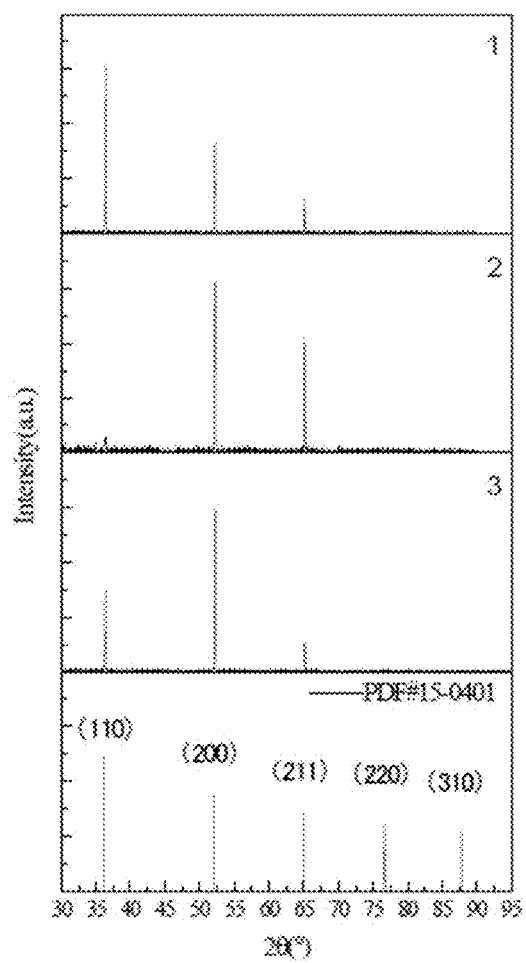
FIG. 1C shows an XRD pattern of three randomly chosen pristine Li foils after chemical polishing showing similar diffraction patterns that can be indexed to bcc Li (JCPDF #15-0401), where the intensity ratios among the diffraction peaks vary.

After polishing of a Li foil, a uniform flatness results, as shown in FIG. 1A, and the surface chemical composition is consistent among samples, as indicated by FIG. 1B. X-ray diffraction (XRD) of the chemically polished pristine Li foil suggests little preferential texturing or crystallographic orientation, with intensity ratios of different diffraction peaks varying, as indicated by three examples of FIG. 1C. All of the peaks can be indexed to the body-centered cubic (bcc) Li (JCPDF #15-0401).

Figure 2:
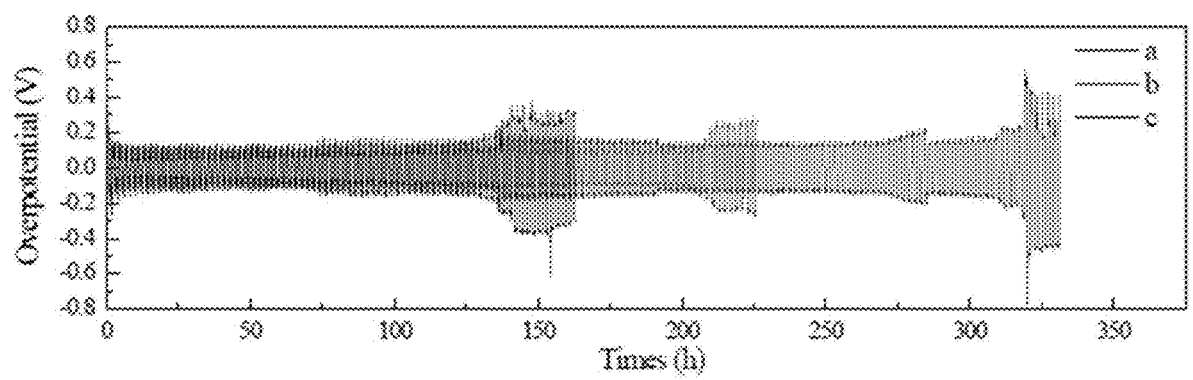
FIG. 2 shows a plot of the cycle performance of symmetric cells assembled by using the chemically polished pristine Li foil at a current density of 1 mA/cm$^2$ and a capacity of 1 mAh/cm$^2$ for three cells showing large variations.
Figure 3A:
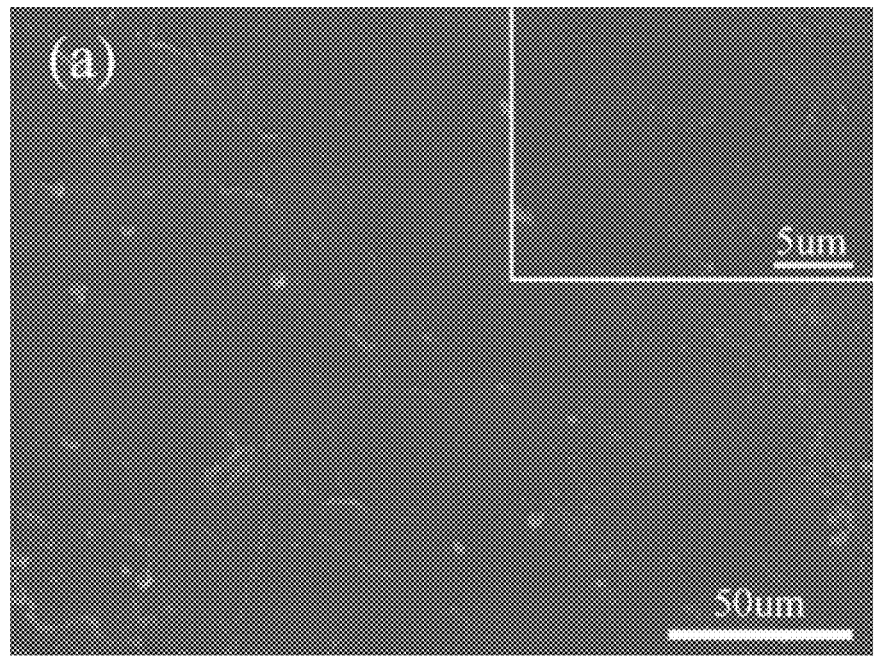
FIG. 3A is a SEM image of treated Li foil with {110} texture after surface preparation.
Figure 3B:
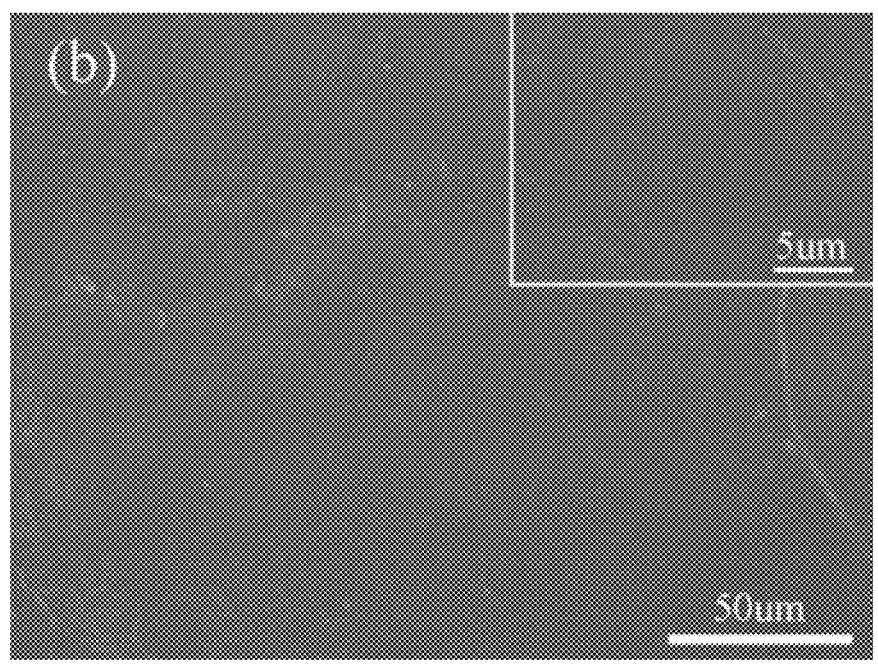
FIG. 3B is a SEM image of treated Li foil with {100} texture after surface preparation.
Figure 3C:
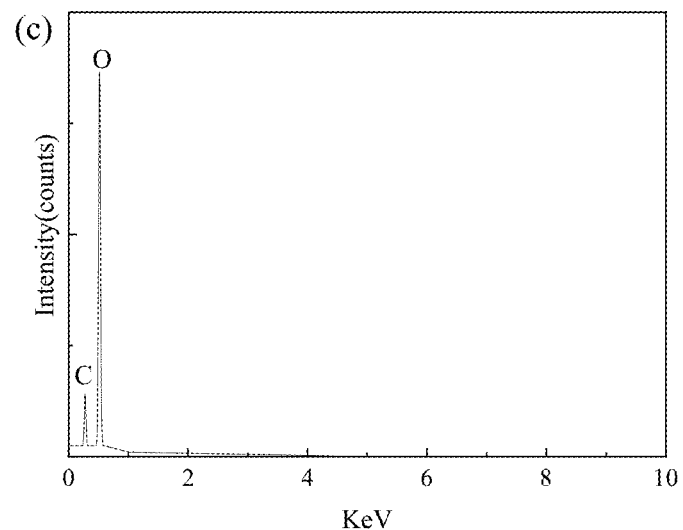
FIG. 3C shows an EDX spectrum of the Li {110} foil of FIG. 3A.
Figure 3D:
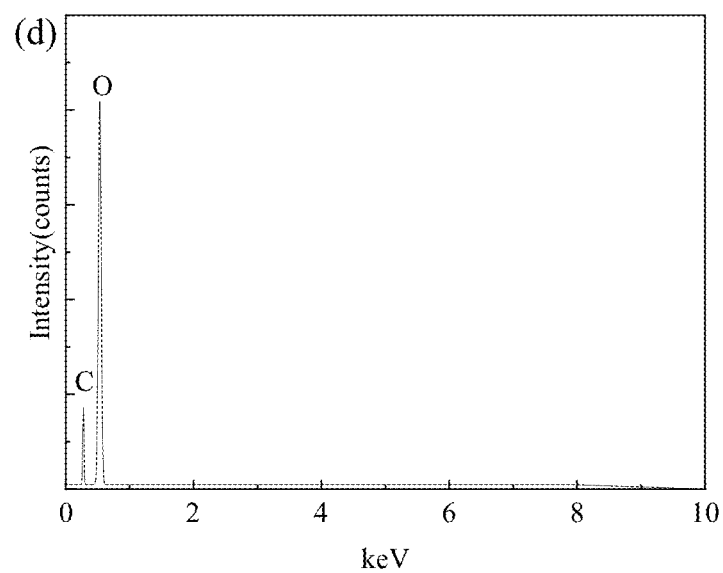
FIG. 3D shows an EDX spectrum of the Li {100} foil of FIG. 3B.
Figure 3E:
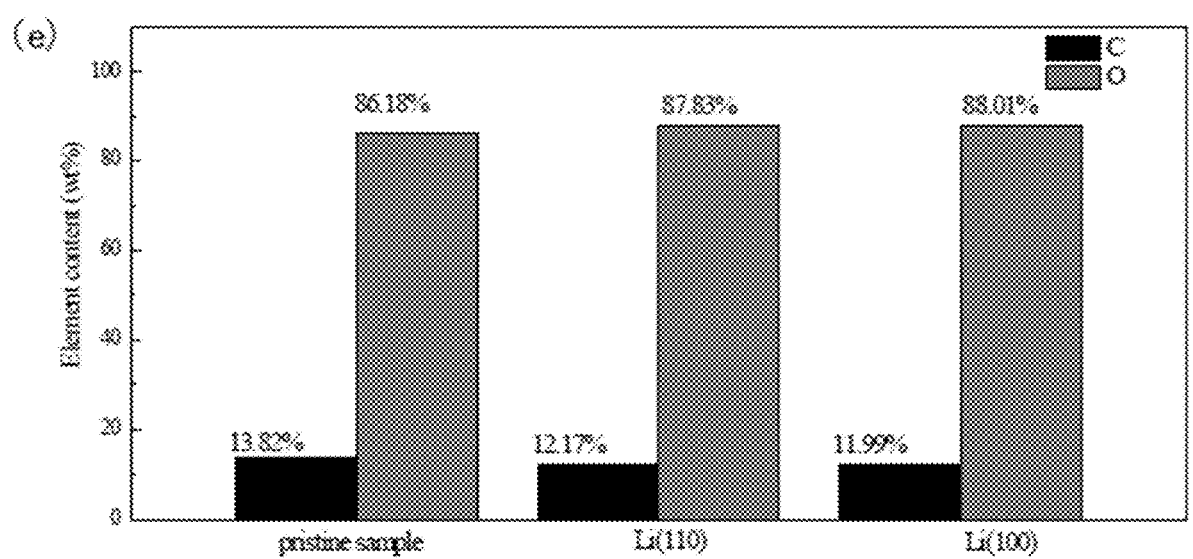
FIG. 3E shows a bar graph of the surface content of pristine Li, Li {110}, and Li {100} foils.

When symmetrical cells are assembled using electrodes of polished Li foil without further processing and a carbonate electrolyte, the voltage profile of the cells is a function of time, FIG. 2, at a current density of 1 mA/cm$^2$ and with a capacity of 1 mAh/cm$^2$, shows large fluctuation of over-potential at the start of cycling, which is ascribed to the formation of SEI, then stabilizes at 0.1 mV. In one exemplary cell of the three cells plotted in FIG. 2, a sudden surge of over-potential occurs at the 99th cycle, together with frequent voltage fluctuations. This is a common indicator of device failure, to which the Li dendrite growth and the formation of dead lithium are known to be major contributors. Cycle performance of different polished Li foils varies significantly, where the drastic increase of over-potential occurs in as little as 50 cycles or does not appear until well after 200 cycles.

Figure 4A:
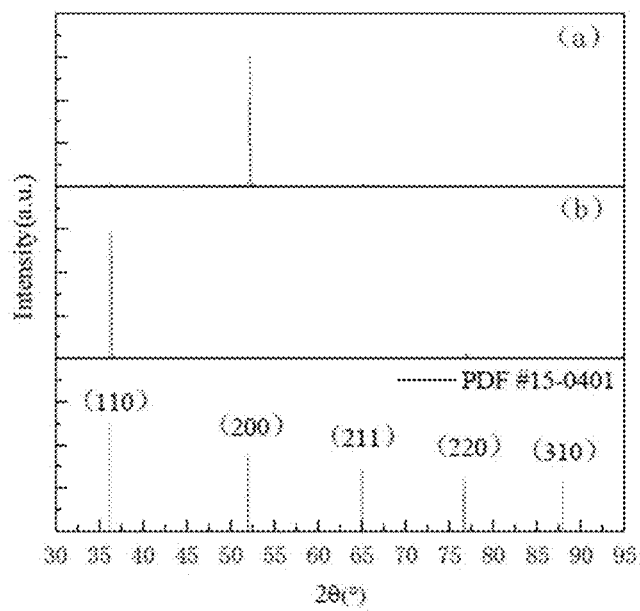
FIG. 4A shows composite X-ray diffraction (XRD) pattern for: (a) Li foil with {100} preferential texturing; and (b) Li foil with {110} preferential texturing, according to an embodiment.
Figure 4B:
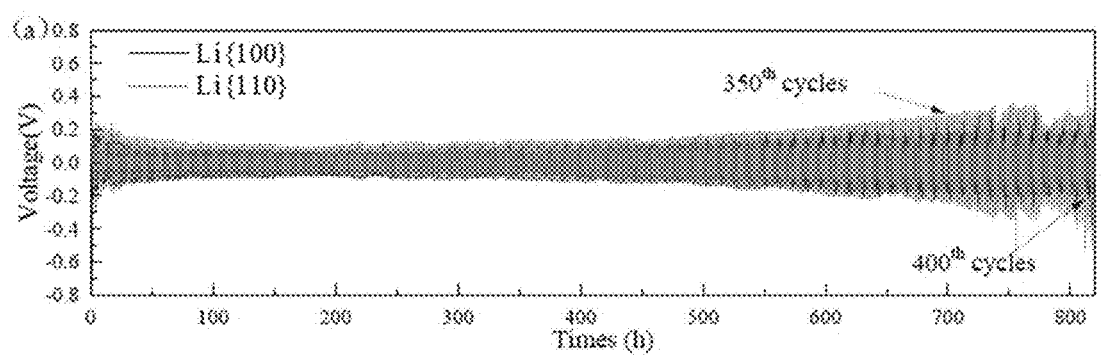
FIG. 4B shows a potential cycle for Li {100} (black) and Li {110} (red) symmetric cells at different current densities of 1 mA/cm$^2$ with a capacity of 1 mAh/cm$^2$ in carbonate electrolyte.
Figure 4C:
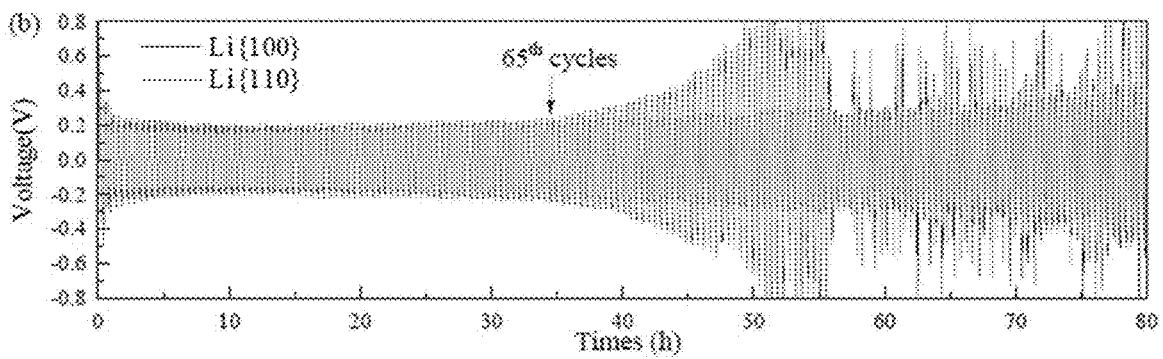
FIG. 4C shows a potential cycle for Li {100} (black) and Li {110} (red) symmetric cells at different current densities of 5 mA/cm$^2$ with a capacity of 1 mAh/cm$^2$ in carbonate electrolyte.
Figure 4D:
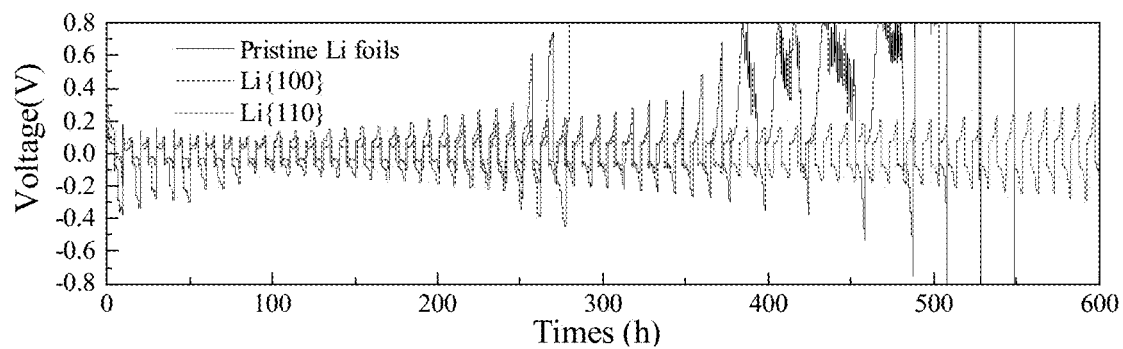
FIG. 4D shows a potential cycle for Li {100} (black) and Li {110} (red) symmetric cells at different current densities of 1 mA/cm$^2$ with a capacity of 5 mAh/cm$^2$ in carbonate electrolyte.
Figure 4E:
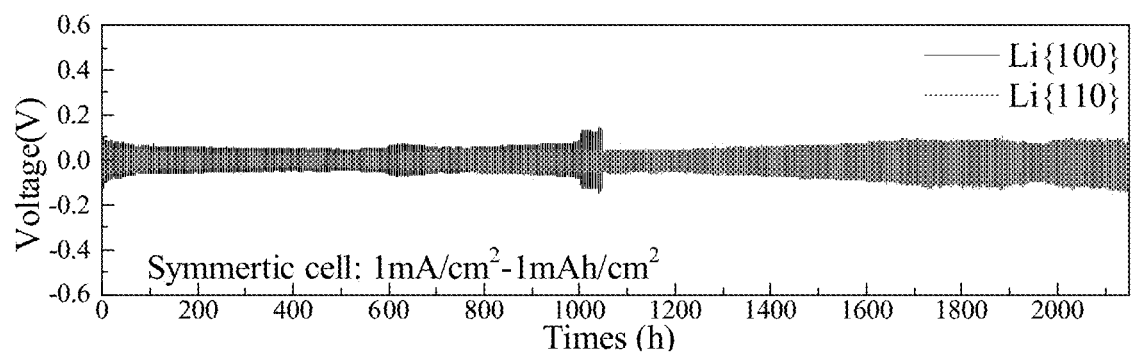
FIG. 4E shows a potential cycle for Li {100} (black) and Li {110} (red) symmetric cells at different current densities of 1 mA/cm$^2$ with a capacity of 1 mAh/cm$^2$ in ethers electrolyte.
Figure 4F:
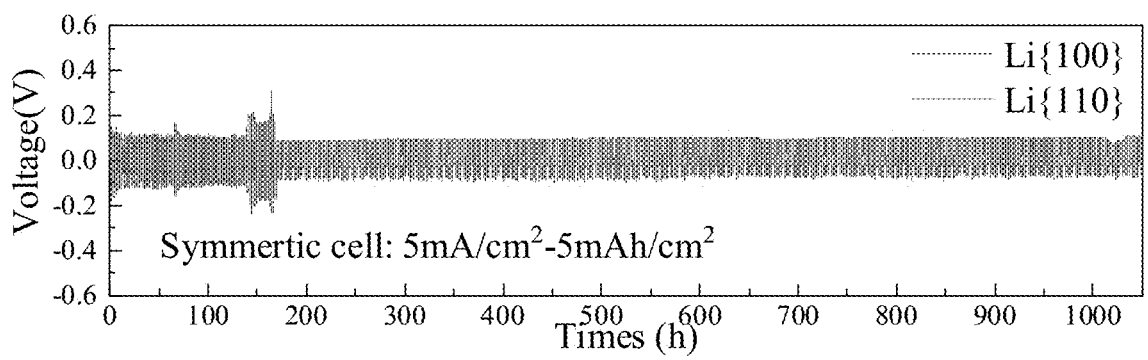
FIG. 4F shows a potential cycle for Li {100} (black) and Li {110} (red) symmetric cells at different current densities of 5 mA/cm$^2$ with a capacity of 5 mAh/cm$^2$ in ethers electrolyte.

Li {110} and Li {100} foils, when polished in the manner of that is carried out as that for the pristine foil shown in FIG. 1A, display similar flatness and chemical composition, as shown in FIG. 3A-3E. An XRD taken from the chemically polished Li {100} shows a strong (200) diffraction of bcc Li, FIG. 4A plot (a), with almost no signal for diffraction of (211) and (110), suggesting preferential {100} surface texturing of the Li {100} foil. In contrast, the XRD of Li {110}, FIG. 4A plot (b), shows a strong (110) diffraction of bcc Li with almost no other diffraction peaks, indicating that the foil sample is of {110} preferential texturing. The galvanostatic charge/discharge performances of Li {110} and Li {100}, symmetric cells at a capacity of 1 mAh/cm$^2$ and different current densities of 1 and 5 mA/cm$^2$ in carbonate electrolyte are shown in FIG. 4B for exemplary cells. At the current density of 1 mA/cm$^2$, the voltage hysteresis of both Li {110} and Li {100} exemplary cells are stable until 250 cycles, where the voltage hysteresis of Li {100} increased rapidly from 180 mV at the 250th cycle to 323 mV at the 350th cycle where fluctuation of the voltage profile appears. In contrast, from the 1st cycle to the 400th cycle, voltage hysteresis of Li {110} slowly increased from 141 mV to 203 mV without much fluctuation. When the current density is increased to 5 mA/cm$^2$, voltage fluctuation appeared for Li {100} after about 100 cycles and a short circuit occurred after about 120 cycles, as indicated in FIG. 4C for exemplary cells. In contrast, Li {110} was stable for more than 150 cycles. At the low current density of 1 mA/cm$^2$, a fairly uniform deposition/stripping of Li on Li {110} occurs. At the higher current density of 5 mA/cm$^2$, the voltage hysteresis of Li {100} and Li {110} are similar in the first 65 cycles where the occurrence of increased ion flow inhomogeneity and aggravated side effects also started to override the benefit brought by the Li {110} surface, yet a much longer cycle life is still achieved for Li {110}. In FIG. 4D, when capacity was increased to 5 mAh/cm$^2$ at the current density of 1 mA/cm$^2$, Li {110} (60 cycles) consistently shown a significantly better performance than those of Li {100} (35 cycles) and pristine Li foil (25 cycles). Better performance of symmetric cells adopting Li {110} were also achieved using ethers electrolyte. In FIG. 4E, at the current density of 1 mA/cm$^2$, the voltage hysteresis of both Li {110} and Li {100} remain stable until 500 cycles (FIG. 2). After that, the voltage hysteresis of Li {100} increased rapidly from 80 mV to ~200 mV, before short-circuiting took place. In contrast, from the 1st to the 1000th cycle, voltage hysteresis of Li {110} slowly increased from ~50 mV to ~120 mV without much fluctuation. When the capacity is improved to 5 mAh/cm$^2$, the voltage hysteresis of Li {100} was raised to ~150 mV and the battery life drops to 80 cycles, while Li {110} were stable for more than 500 cycles in FIG. 4F. Without employing an artificial SEI, the Li symmetric cell using the Li {110} demonstrated comparable performance to those in the literature that employ artificial SEI (e.g., LiDFOB and graphite fluoride etc.)

Figure 5B:
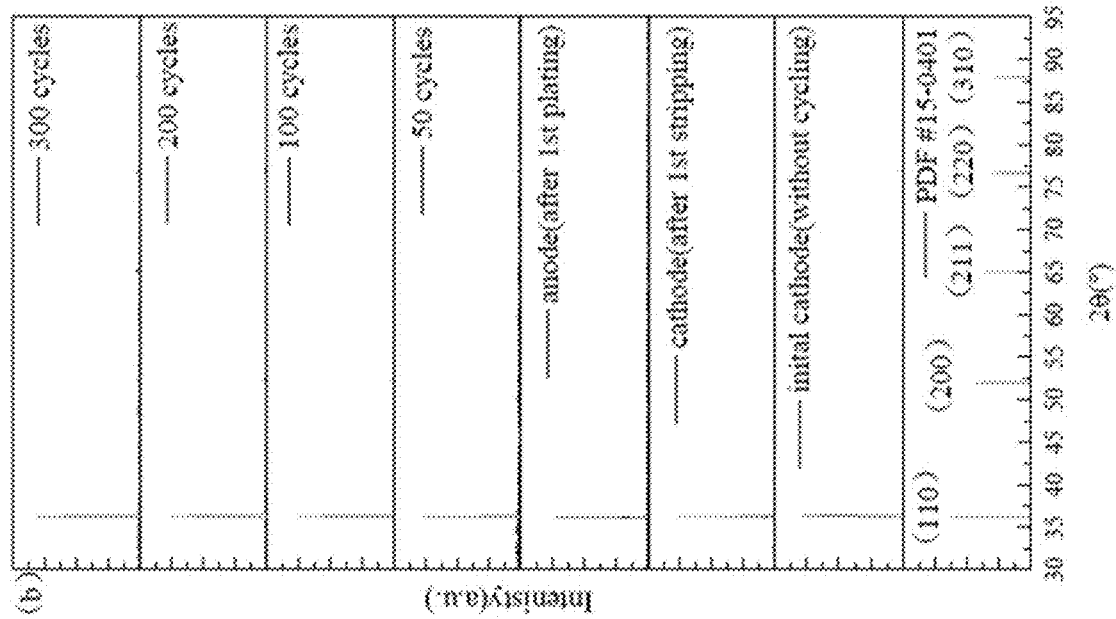
FIG. 5B shows the evolution of XRD patterns of the symmetrical cells with a Li {110} electrode at a current density of 1 mA/cm$^2$ with a capacity of 1 mAh/cm$^2$.
Figure 5A:
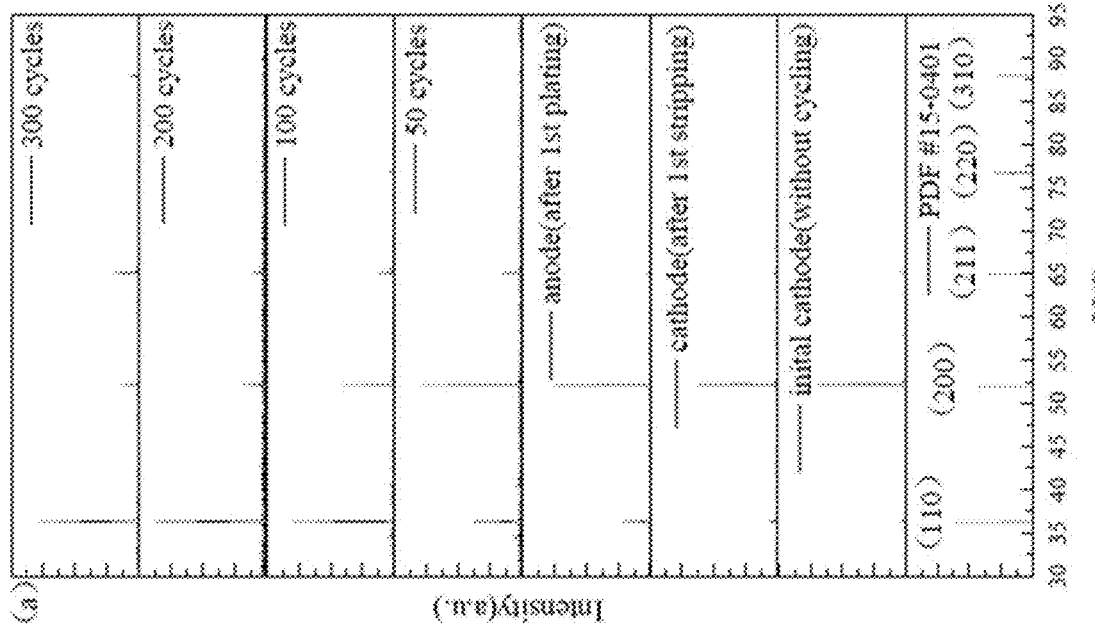
FIG. 5A shows the evolution of XRD patterns of the symmetrical cells with a Li {100} electrode at a current density of 1 mA/cm$^2$ with a capacity of 1 mAh/cm$^2$.

Texturing evolution of the Li {110} and (100) electrodes by ex-situ XRD taken at different cycle numbers for exemplary symmetrical cells cycled at a current density of 1 mA/cm$^2$ with a capacity of 1 mAh/cm$^2$, are shown in FIGS. 5A and 5B. After being charged to the capacity of 1 mAh/cm$^2$, the cathode of the symmetrical cells using Li {100} experienced a stripping process. As shown in FIG. 5A, the signal of the (110) diffraction that was nearly absent in the initial cathode (without cycling) is nearly absent. At the same time, the signal of the (110) diffraction is found in the anode that experienced plating. At the end of the 50th cycle, the (200) diffraction remains the most intense, but the intensity of the (110) diffraction grows continuously with cycles until at the end of the 100th cycle, the (110) diffraction becomes dominant. At the end of the 300th cycles, the diffraction intensity of (211) also exceeds that of the (200). In contrast, as shown in FIG. 5B for the Li {110} electrode, the dominant diffraction intensity of (110) is maintained from the 1st to the last cycles, with little diffraction intensity of (211) or (200) can be observed until 300th cycle.

Figure 5D:
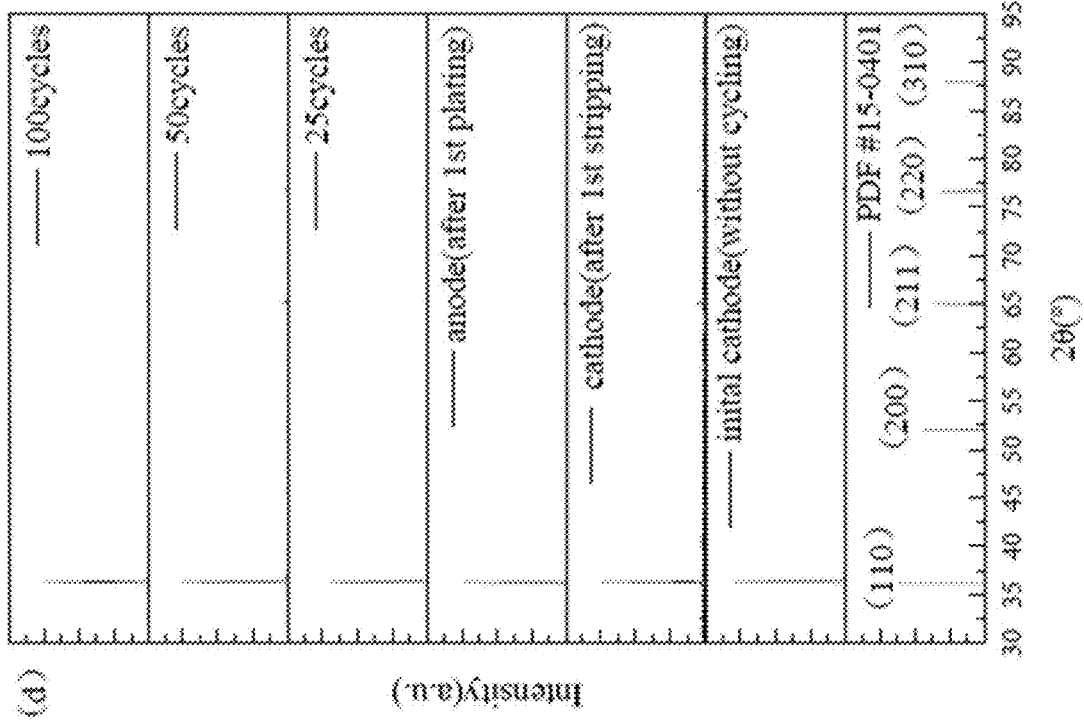
FIG. 5D shows the evolution of XRD patterns of the symmetrical cells with a Li {110} electrode at a current density of 5 mA/cm$^2$ with a capacity of 1 mAh/cm$^2$.
Figure 5C:
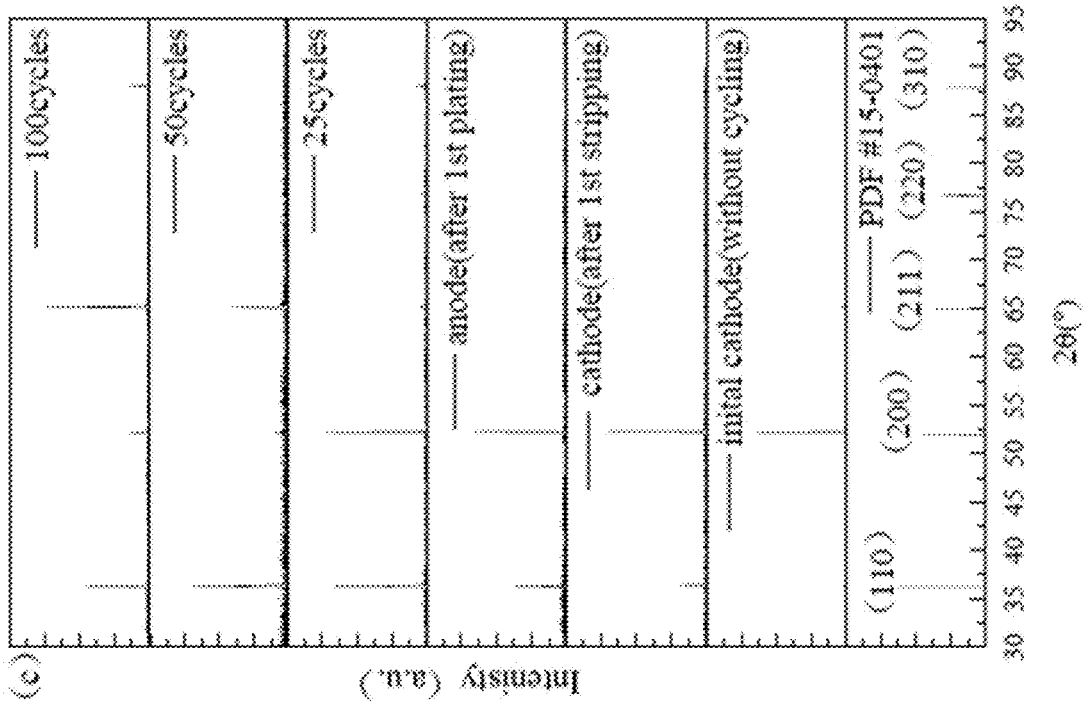
FIG. 5C shows the evolution of XRD patterns of the symmetrical cells with a Li {100} electrode at a current density of 5 mA/cm$^2$ with a capacity of 1 mAh/cm$^2$.
Figure 5E:
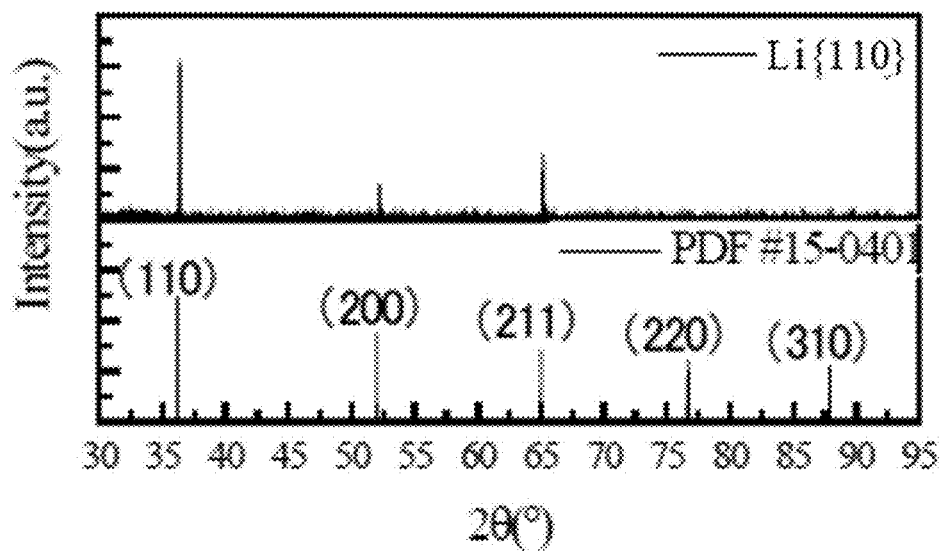
FIG. 5E shows the XRD pattern of the Li foil after 150th cycles at a current density of 5 mA/cm$^2$ with the capacity of 1 mAh/cm$^2$ where (110) remains dominant but (200) and (211) diffractions can also be observed.

Similar exemplary symmetrical cells are cycled at a current density of 5 mA/cm$^2$ with the same capacity (1 mAh/cm$^2$), the evolution of the XRD patterns, as shown in FIGS. 5C and 5D for Li electrode composed of Li {110} or Li {100} foils, respectively. After charging to a capacity of 1 mAh/cm$^2$, the Li {100} electrode rapidly loses its preferential texturing of {100}, and the (110) diffraction becomes dominant after only 50 cycles, with the intensity of the (211) diffraction drastically increases from the 50th to the 100th cycles, and becomes dominant after the 100th cycle. In contrast, the diffraction intensity of (110) maintains its dominance in the Li {110} electrode through the 100th cycle. The exemplary Li {100} electrode shorted after the 100th cycle, while the Li {110} runs much longer, though when ~150 cycles was achieved, low intensity (211) and (200) diffractions become apparent, as shown in FIG. 5E.

Figure 6A:
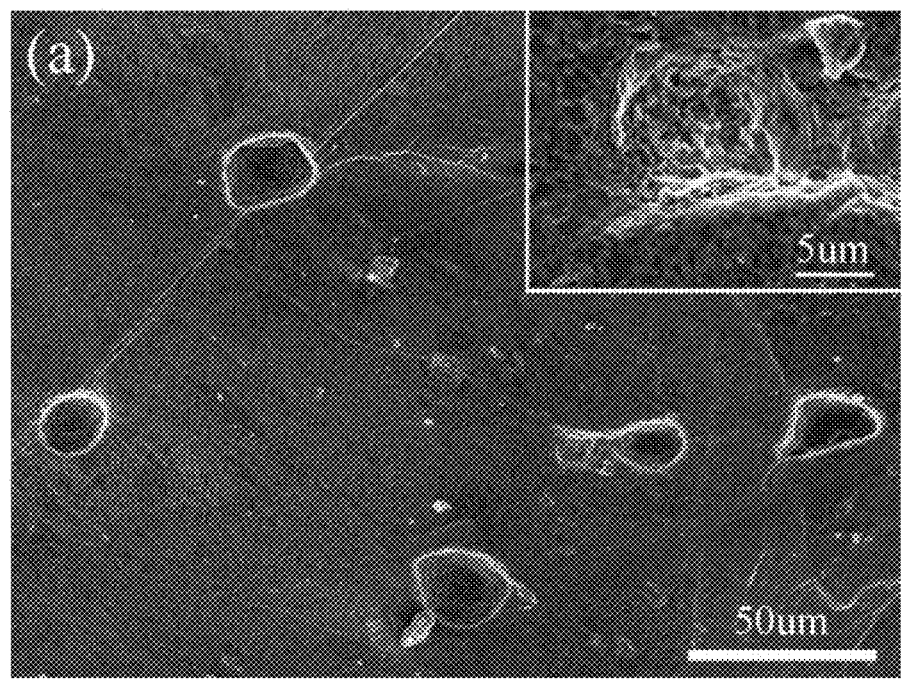
FIG. 6A is a scanning electron microscopy (SEM) image of a Li {100} surface morphology after being stripped at a current density of 1 mA/cm$^2$ with a capacity of 1 mAh/cm$^2$.
Figure 6B:
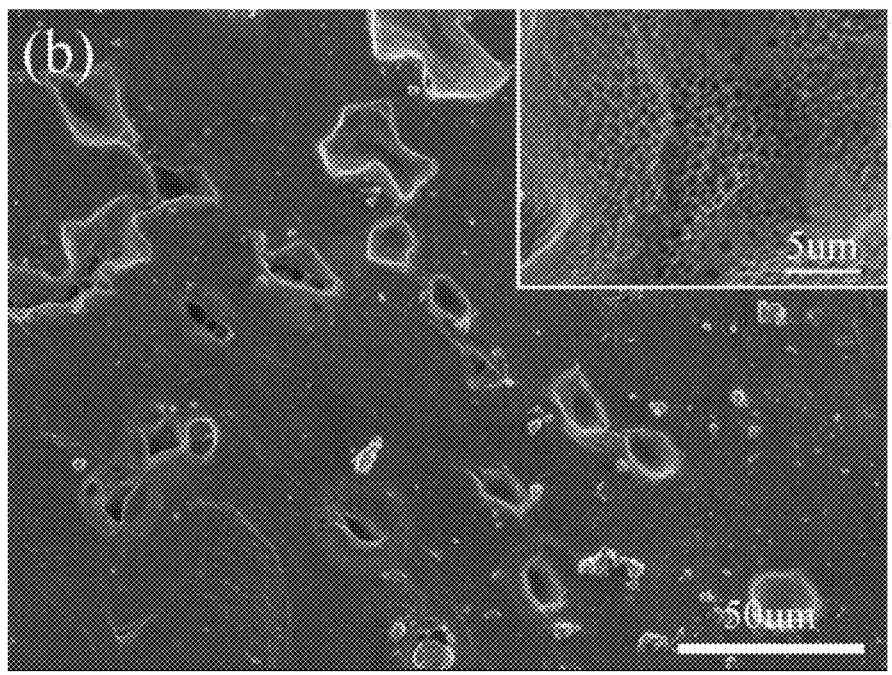
FIG. 6B is a SEM image of a Li {100} surface morphology after being stripped at a current density of 5 mA/cm$^2$ with a capacity of 1 mAh/cm$^2$.
Figure 6C:
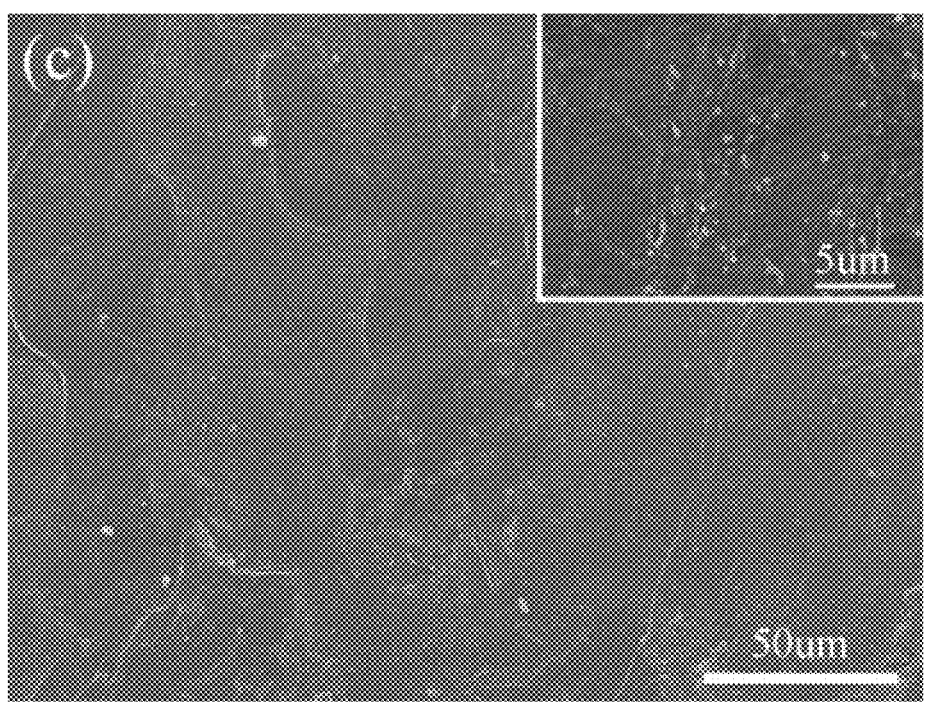
FIG. 6C is a SEM image of a Li {110} surface morphology after being stripped at a current density of 1 mA/cm$^2$ with a capacity of 1 mAh/cm$^2$.
Figure 6D:
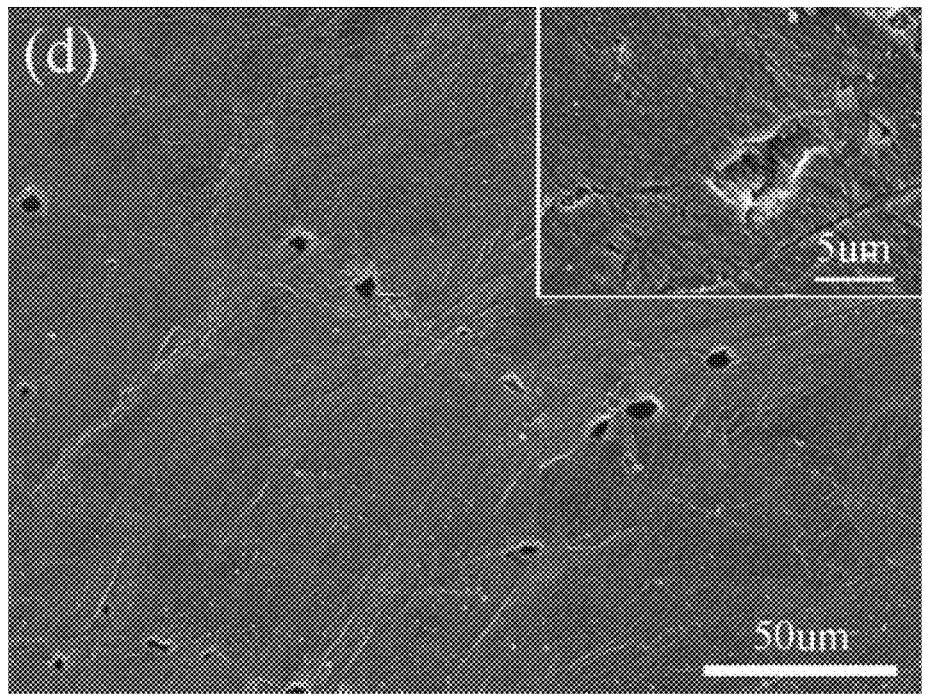
FIG. 6D is a SEM image of a Li {110} surface morphology after being stripped at a current density of 5 mA/cm$^2$ with a capacity of 1 mAh/cm$^2$
Figure 6E:
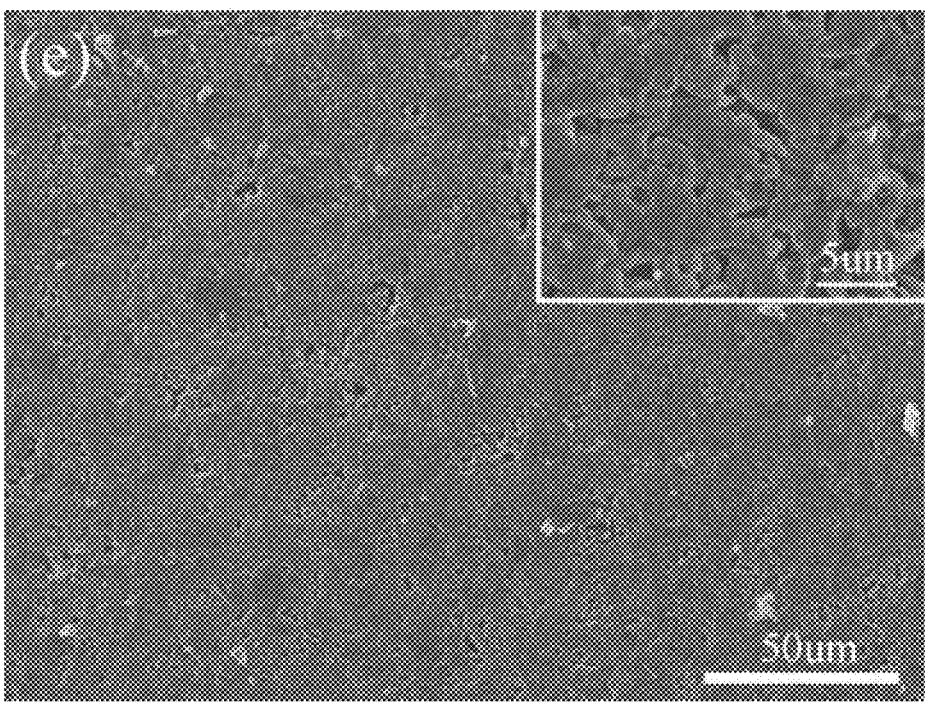
FIG. 6E is a SEM image of a Li {100} surface morphology after being plated at a current density of 1 mA/cm$^2$ with a capacity of 1 mAh/cm$^2$.
Figure 6F:
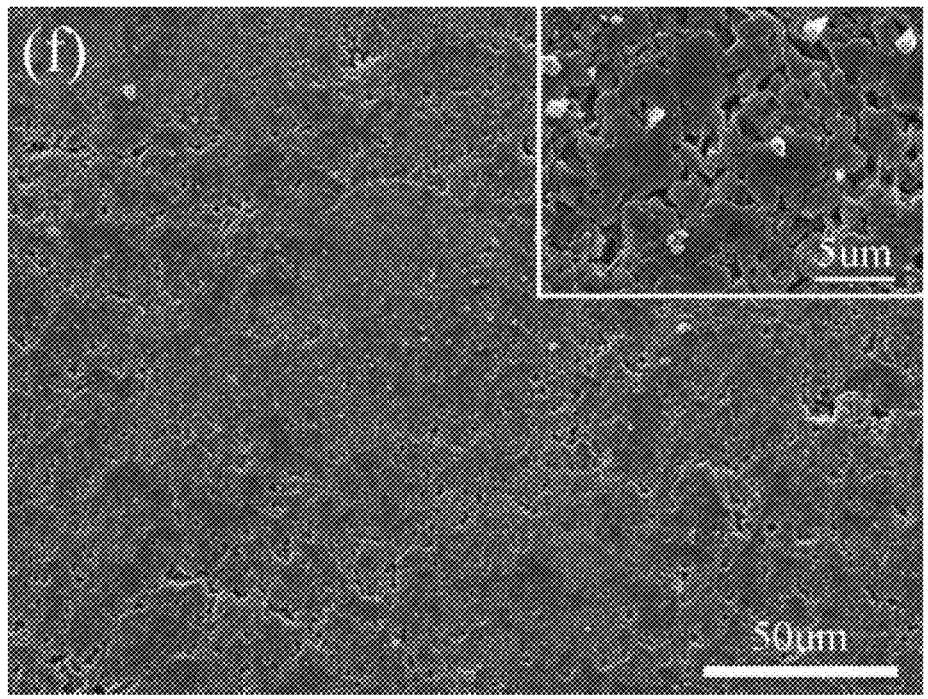
FIG. 6F is a SEM image of a Li {100} surface morphology after being plated at a current density of 5 mA/cm$^2$ with a capacity of 1 mAh/cm$^2$.
Figure 6G:
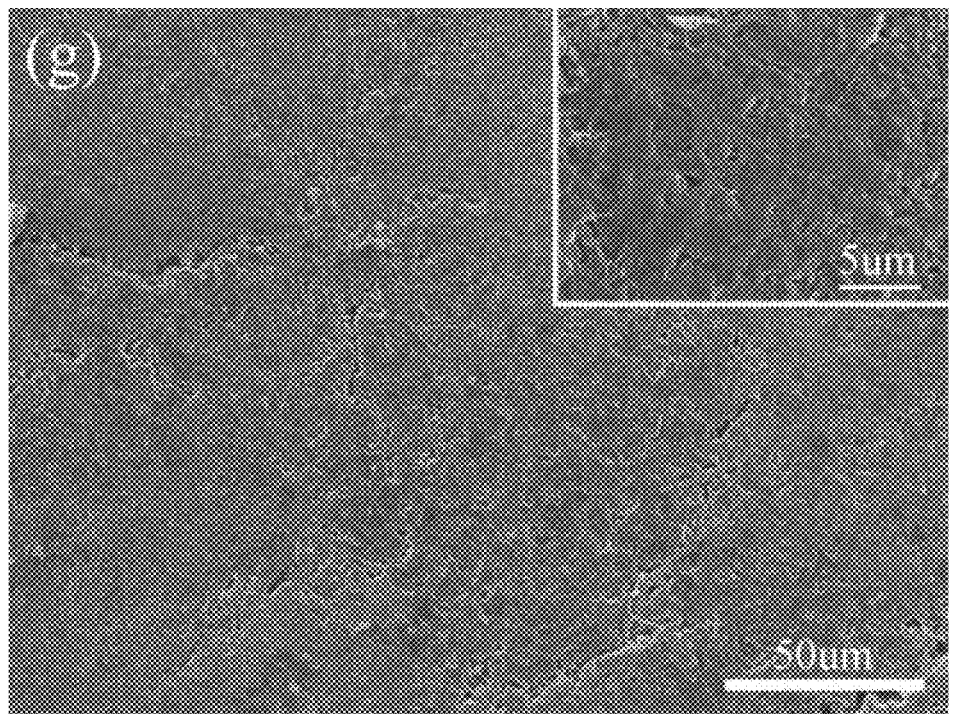
FIG. 6G is a SEM image of a Li {110} surface morphology after being plated at a current density of 1 mA/cm$^2$ with a capacity of 1 mAh/cm$^2$.
Figure 6H:
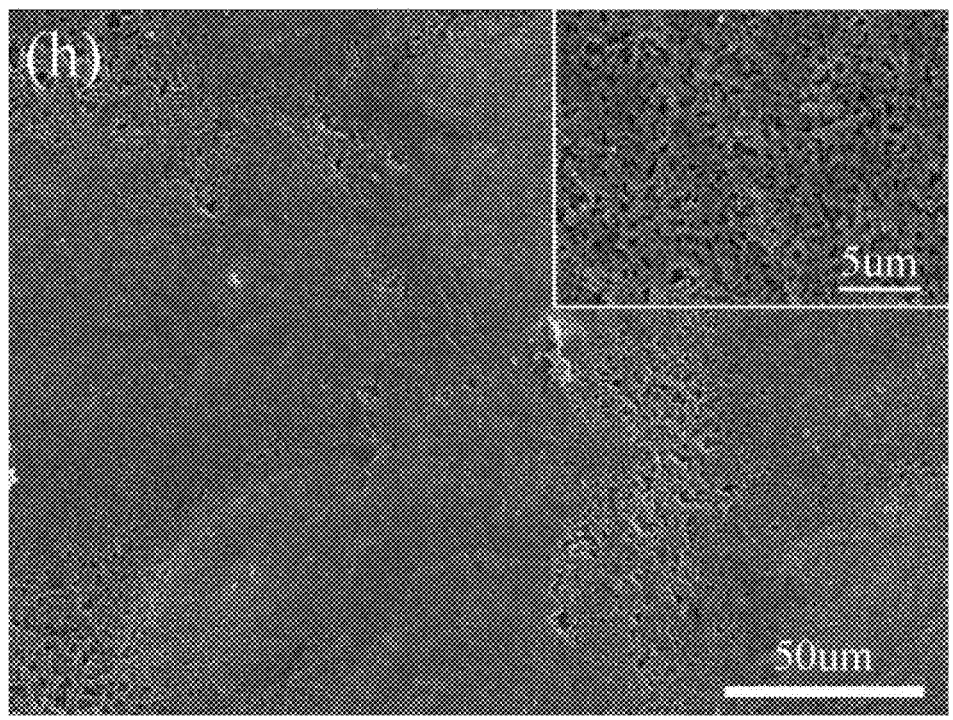
FIG. 6H is a SEM image of a Li {110} surface morphology after being plated at a current density of 5 mA/cm$^2$ with a capacity of 1 mAh/cm$^2$.
Figure 6I:
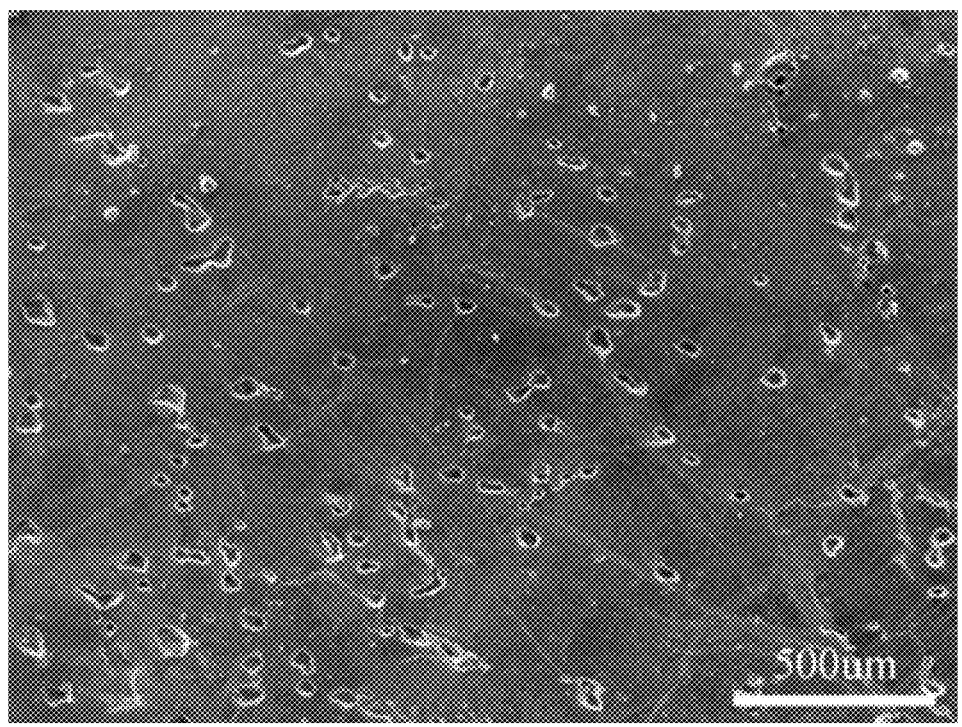
FIG. 6I is a SEM image of pristine Li foil surface morphology after being stripped at a current density of 1 mA/cm$^2$ with the capacity of 1 mAh/cm$^2$.
Figure 7A:
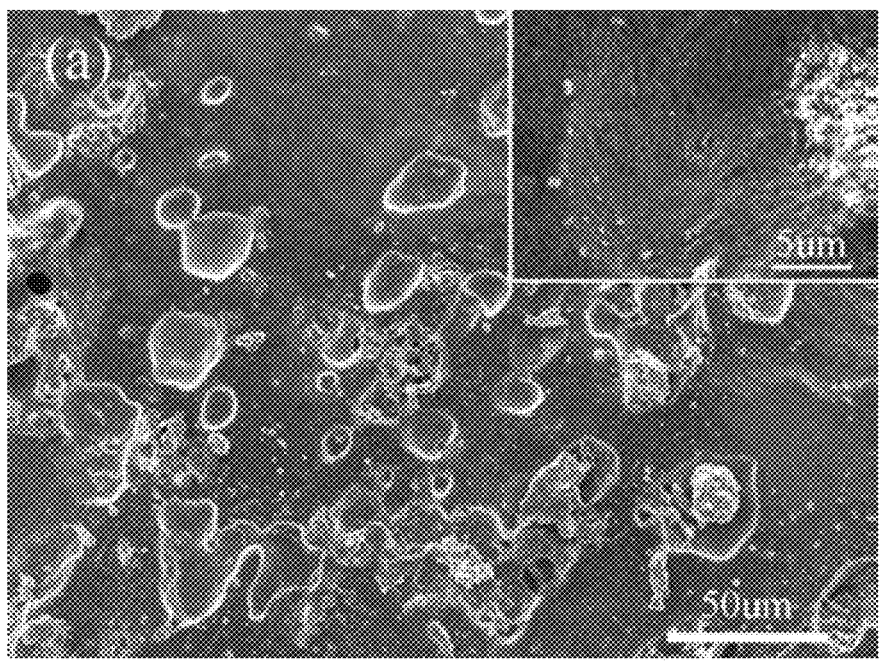
FIG. 7A is a SEM image of the Li {100} anode of a symmetrical cell after being stripped in the first cycle at a current density of 1 mA/cm$^2$ with the capacity of 1 mAh/cm$^2$.
Figure 7B:
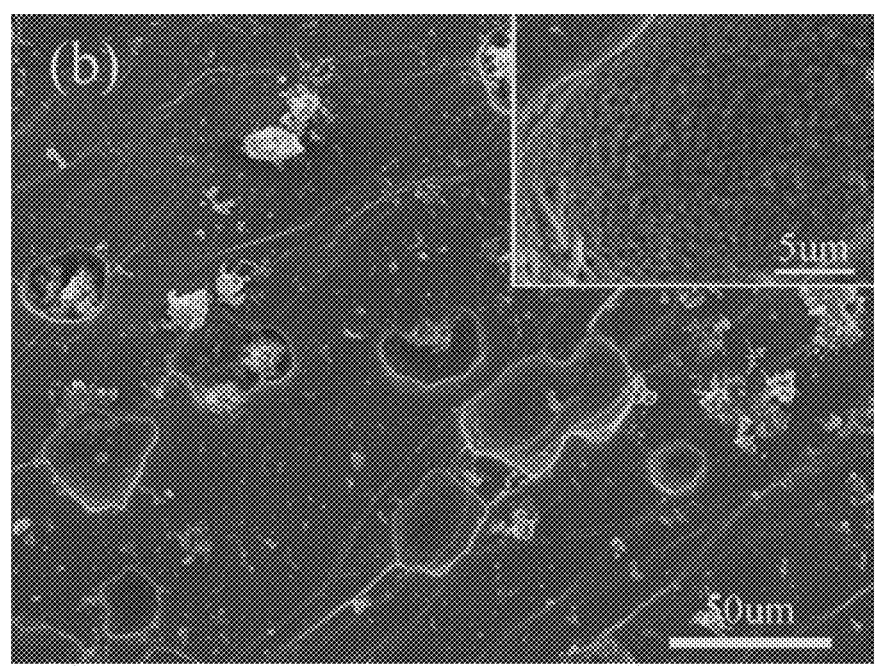
FIG. 7B is a SEM image of the Li {100} anode of a symmetrical cell after being stripped in the first cycle at a current density of 5 mA/cm$^2$ with the capacity of 1 mAh/cm$^2$.
Figure 7C:
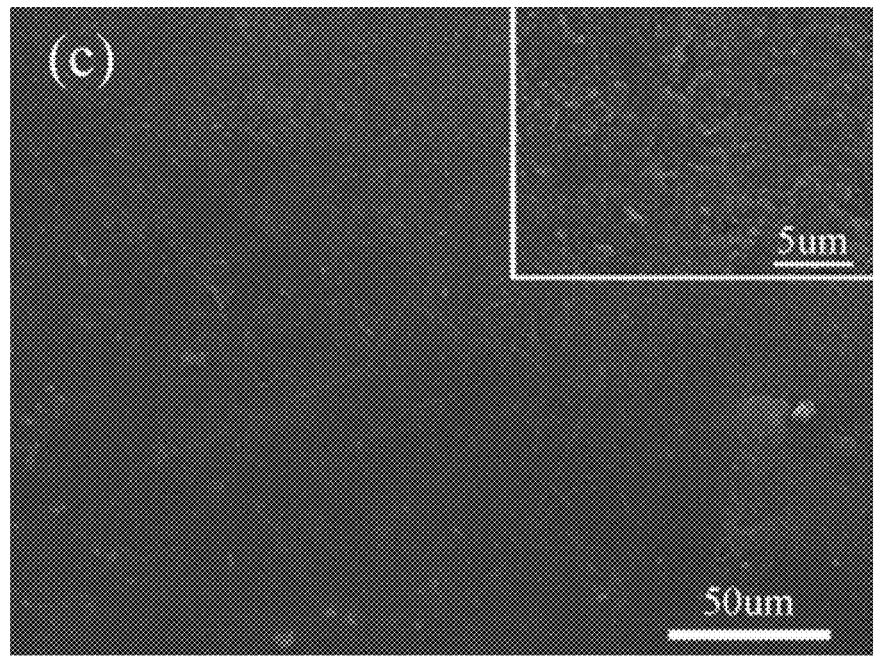
FIG. 7C is a SEM image of the Li {110} anode of a symmetrical cell after being stripped in the first cycle at a current density of 1 mA/cm$^2$ with the capacity of 1 mAh/cm$^2$.
Figure 7D:
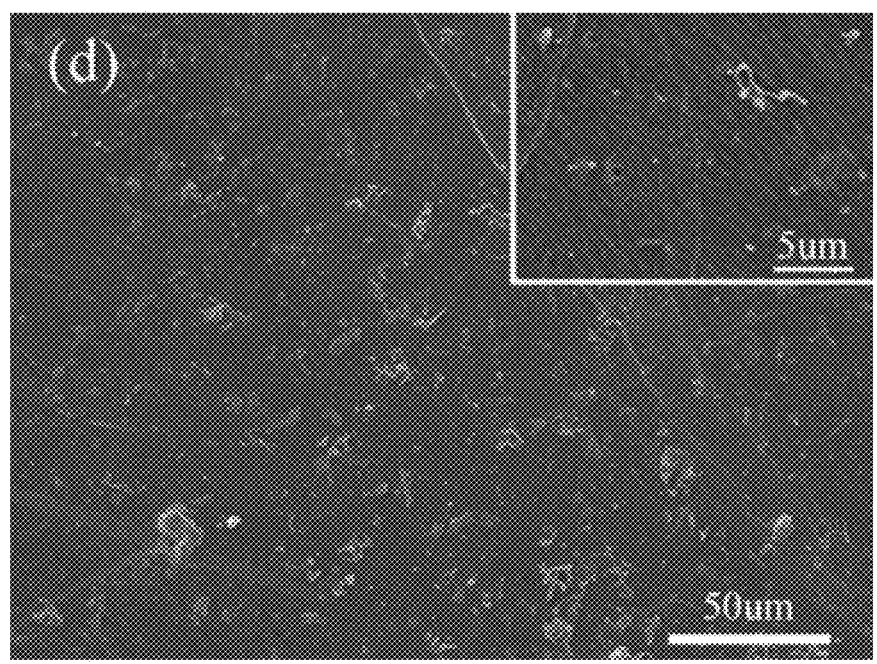
FIG. 7D is a SEM image of the Li {110} anode of a symmetrical cell after being stripped in the first cycle at a current density of 5 mA/cm$^2$ with the capacity of 1 mAh/cm$^2$.
Figure 7E:
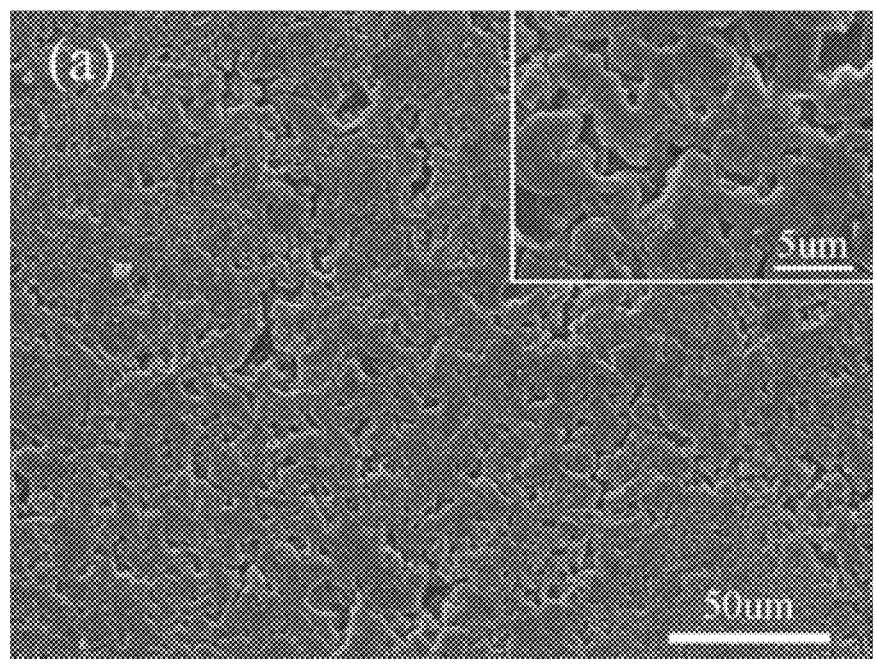
FIG. 7E is a SEM image of a Li {100} cathode of a symmetrical cell after being plated with the capacity of 1 mAh/cm$^2$ at a current density of 1 mA/cm$^2$.
Figure 7F:
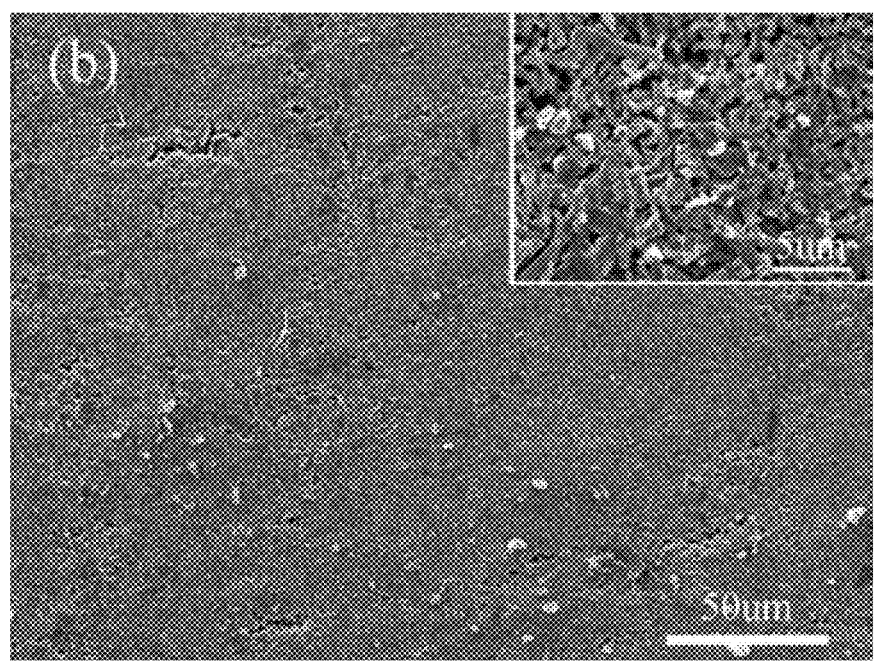
FIG. 7F is a SEM image of a Li {100} cathode of a symmetrical cell after being plated with the capacity of 1 mAh/cm$^2$ at a current density of 5 mA/cm$^2$.
Figure 7G:
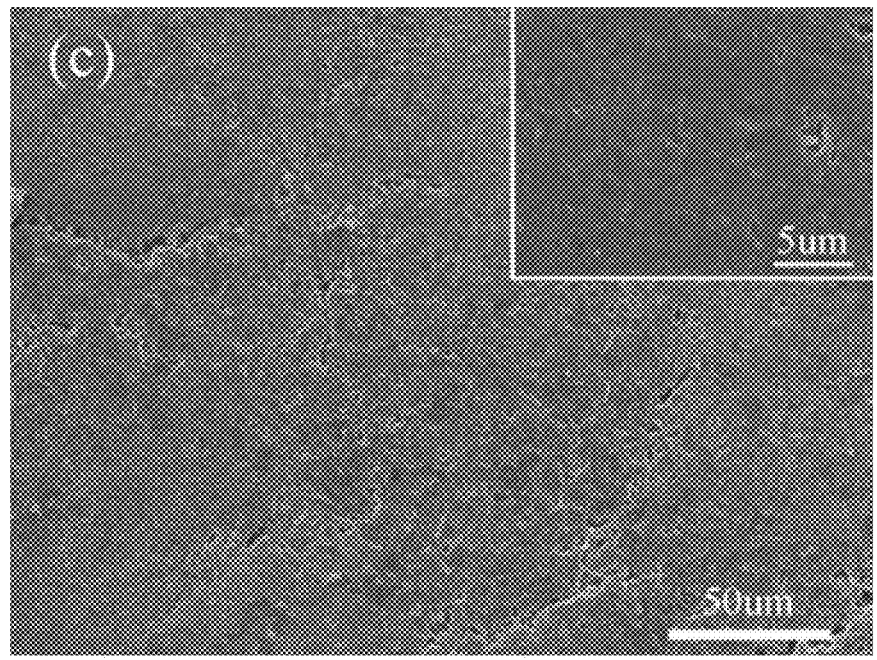
FIG. 7G is a SEM image of a Li {110} cathode of a symmetrical cell after being plated with the capacity of 1 mAh/cm$^2$ at a current density of 1 mA/cm$^2$.
Figure 7H:
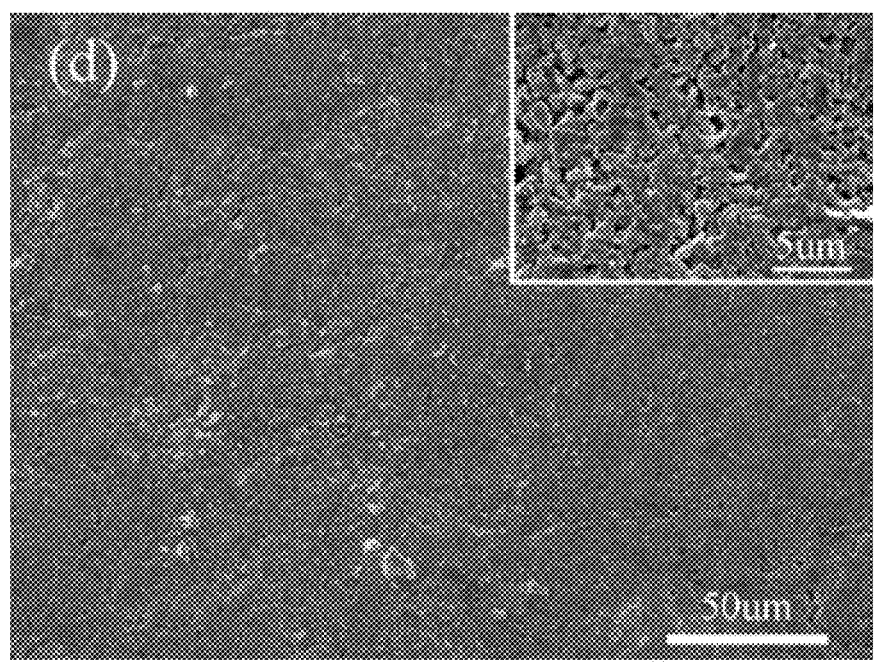
FIG. 7H is a SEM image of a Li {110} cathode of a symmetrical cell after being plated with the capacity of 1 mAh/cm$^2$ at a current density of 5 mA/cm$^2$.

The surface morphologies of these exemplary Li {100} and {110} electrodes show surface feature changes in SEMs during cycling as shown in FIGS. 6A through 6H. The stripped surface of Li {100} foils after the first cycle is shown in FIGS. 6A and 6B, where a pitted surface is observed in cells using Li {100} as the starting electrode at current densities of 1 mA/cm$^2$ and 5 mA/cm$^2$, respectively, where more pits appear in samples cycled at 5 mA/cm$^2$ relative to cells cycled at 1 mA/cm$^2$. Enlarged images, and inserts in FIGS. 6A and 6B, of the pitted regions show a porous-like surface inside the pit. Similar pitting occurs for Li foils without preferential texturing, as shown in FIG. 6I. In comparison, the stripped surface of a Li {110} foil is very different, where at a low current density, 1 mA/cm$^2$, the Li surface remains flat with little pitting, as shown in FIG. 6C, and at the higher current density of 5 mA/cm$^2$, as shown in FIG. 6D a few pits appear but whose size is significantly smaller than those on Li {100} surface. When the Li anode surface is plated, particle-like deposits formed on the surfaces of Li {100} and Li {110}. Anode of Li {100}, displays particles formed at a current density of 1 mA/cm², FIG. 6E, that are denser than those formed at 5 mA/cm², FIG. 6F. This trend is observed in anodes of Li {110}, FIGS. 6G and 6H, though the plated Li is denser on Li {110} than that on Li {100} at both current densities examined. In the discharge process following the first cycle, the newly plated Li anode is stripped significantly pitting of the surface for Li {100} but not for Li {110} are observed that is similar to that of the Li cathode surfaces at the end of the first charging, as shown in FIGS. 7A through 7D. The discharge process results in the plating of the Li cathode that is stripped during the initial charging. Most of the pitted surface of Li {100} is covered with the new deposits, and a denser surface is observed for the cathode of Li {110} than for the cathode of Li {100}, as shown in FIGS. 7E through 7H.

Figure 8A:
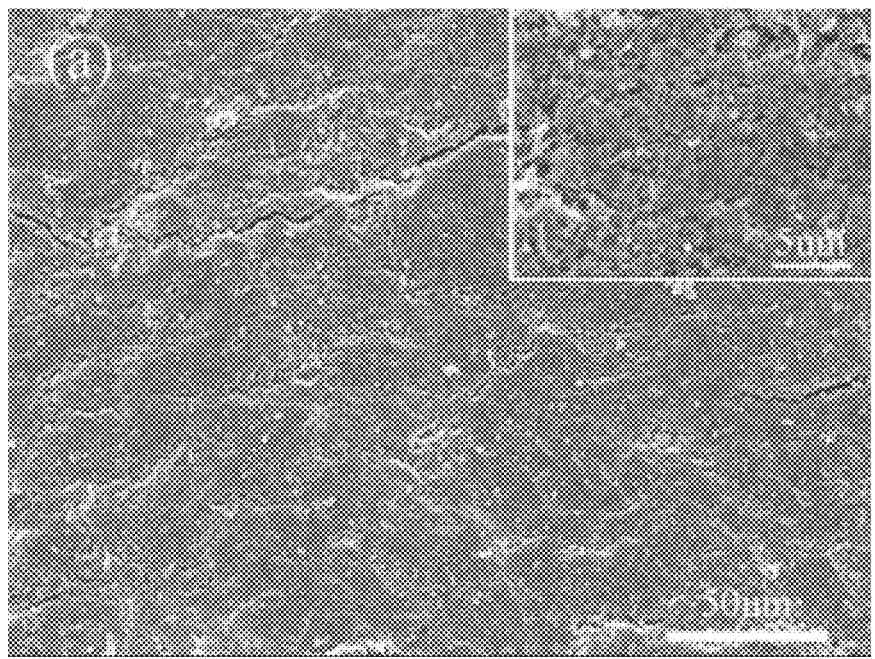
FIG. 8A is a SEM image of a Li {100} at 50 cycles at a current density of 1 mA/cm$^2$ with the capacity of 1 mAh/cm$^2$.
Figure 8B:
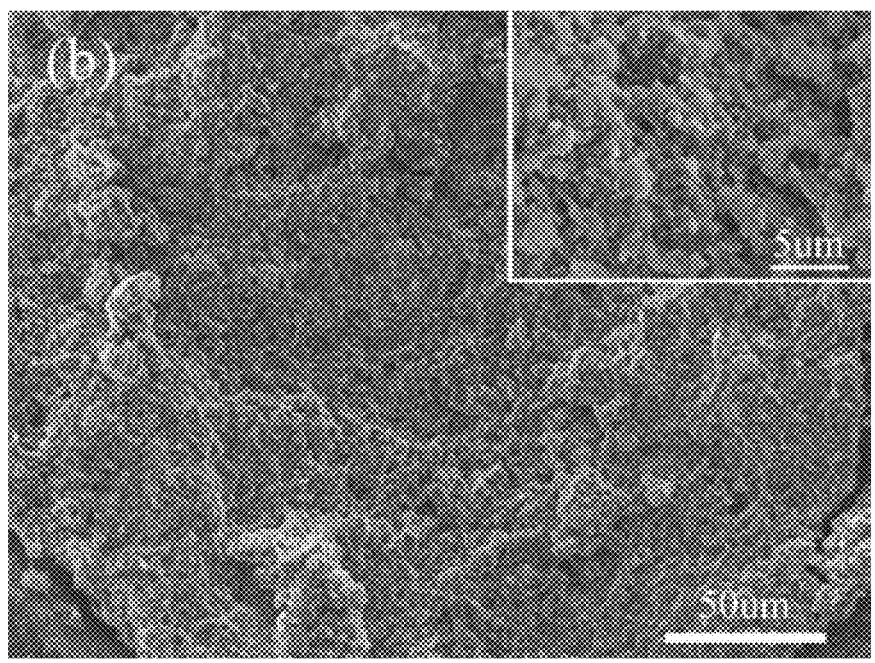
FIG. 8B is a SEM image of a Li {100} at 300 cycles at a current density of 1 mA/cm$^2$ with the capacity of 1 mAh/cm$^2$.
Figure 8C:
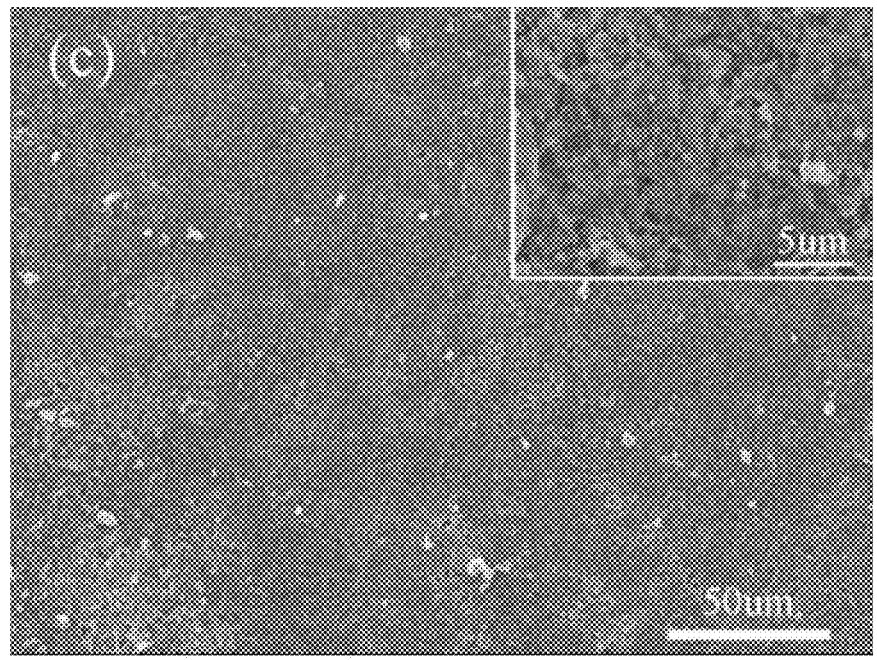
FIG. 8C is a SEM image of a Li {110} at 50 cycles at a current density of 1 mA/cm$^2$ with the capacity of 1 mAh/cm$^2$.
Figure 8D:
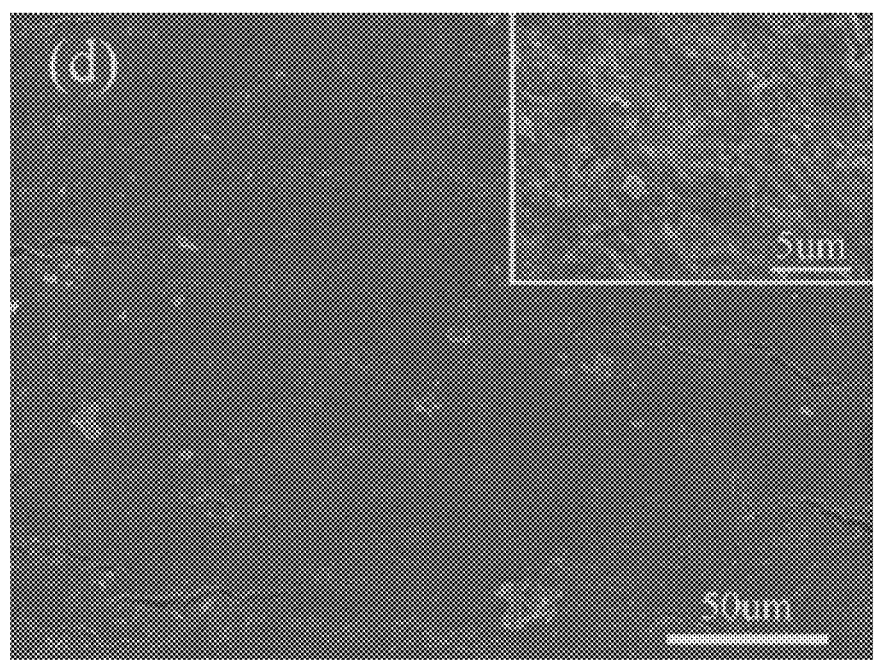
FIG. 8D is a SEM image of a Li {110} at 300 cycles at a current density of 1 mA/cm$^2$ with the capacity of 1 mAh/cm$^2$.
Figure 9A:
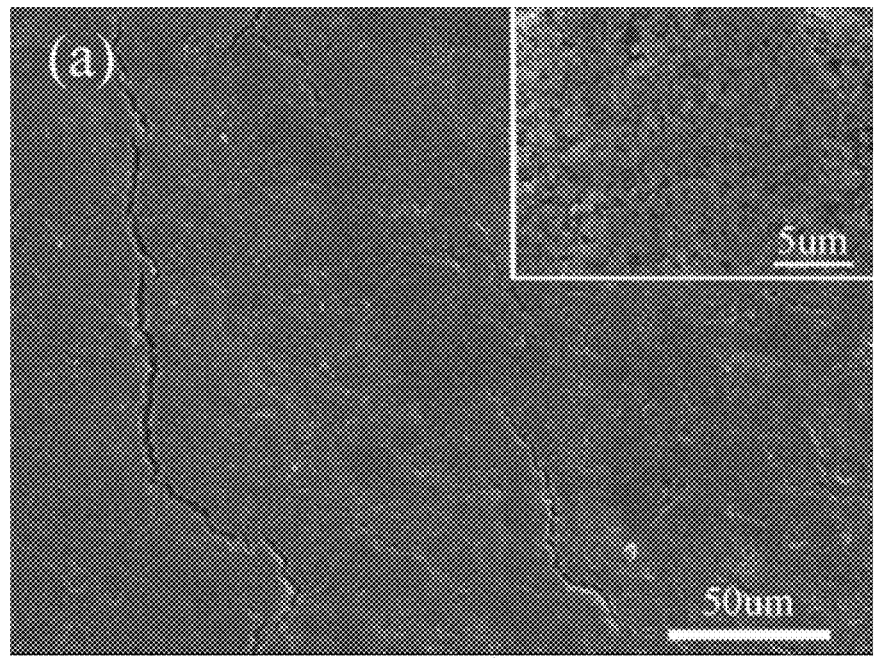
FIG. 9A is a SEM image of a Li {100} at 25 cycles at a current density of 5 mA/cm$^2$ with the capacity of 1 mAh/cm$^2$.
Figure 9B:
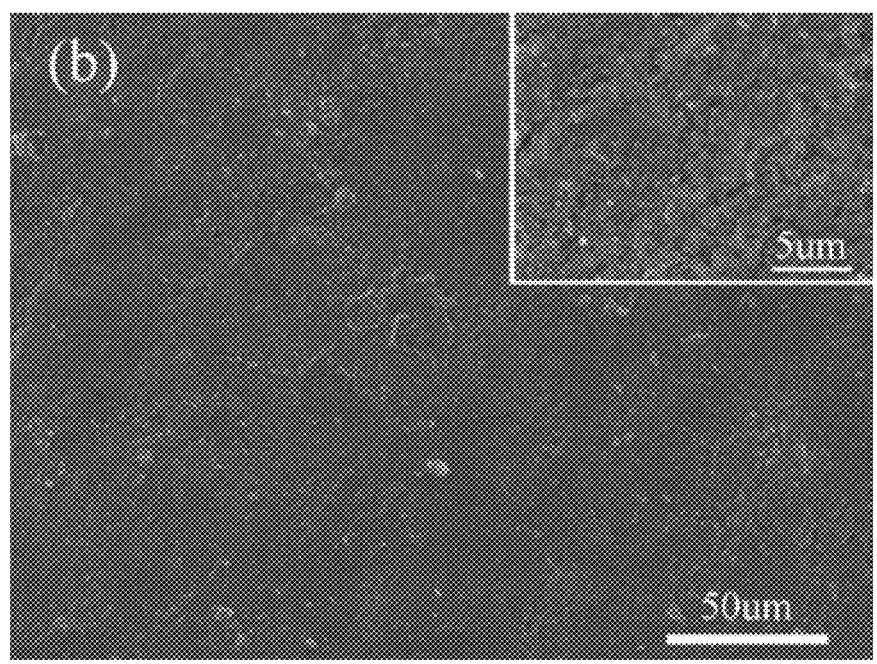
FIG. 9B is a SEM image of a Li {110} at 25 cycles at a current density of 5 mA/cm² with the capacity of 1 mAh/cm².
Figure 9C:
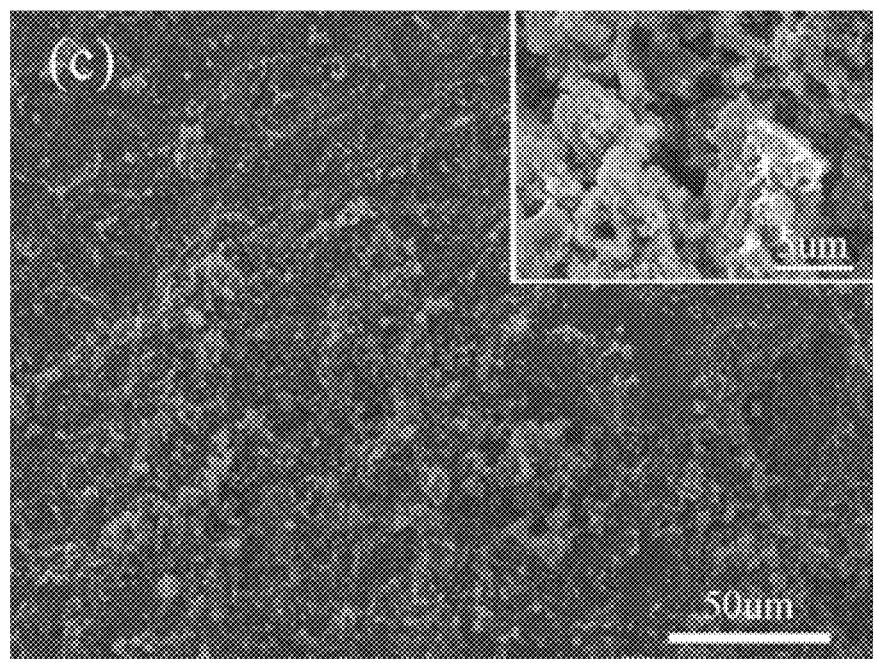
FIG. 9C is a SEM image of a Li {100} at 50 cycles at a current density of 5 mA/cm² with the capacity of 1 mAh/cm².
Figure 9D:
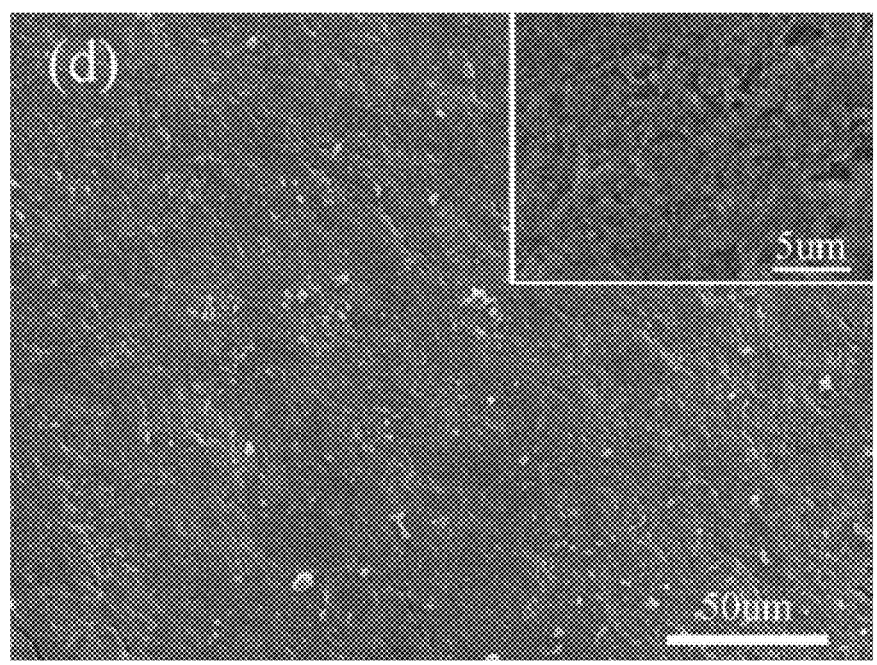
FIG. 9D is a SEM image of a Li {110} at 50 cycles at a current density of 5 mA/cm² with the capacity of 1 mAh/cm².
Figure 9E:
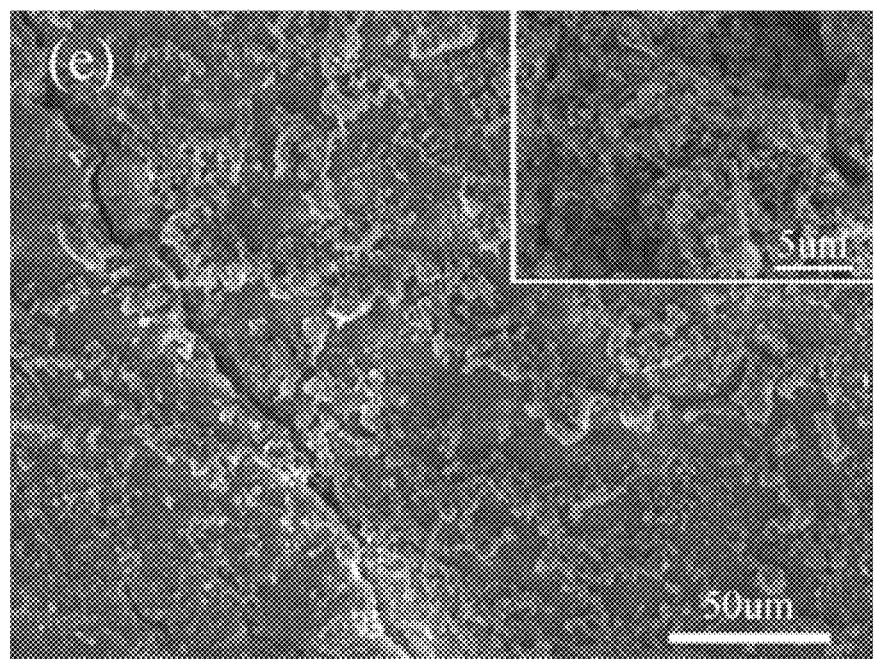
FIG. 9E is a SEM image of a Li {100} at 100 cycles at a current density of 5 mA/cm² with the capacity of 1 mAh/cm².
Figure 9F:
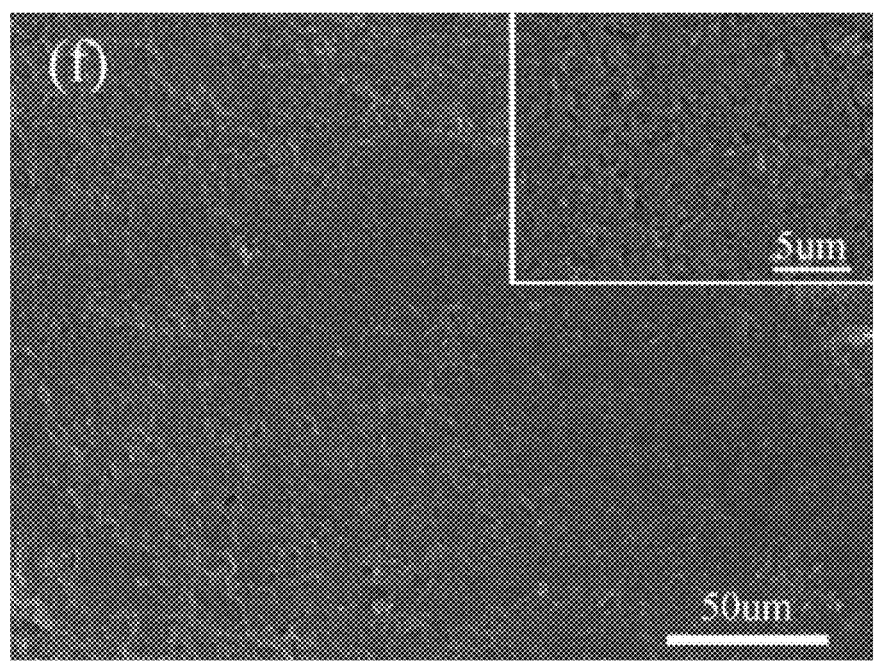
FIG. 9F is a SEM image of a Li {110} at 100 cycles at a current density of 5 mA/cm² with the capacity of 1 mAh/cm².

The morphology of Li foils after cycling at a current density of 1 mA/cm² with the capacity of 1 mAh/cm² are shown in FIGS. 8A through 8D. The morphology of the Li {100} surface after 300 cycles, FIG. 8B is much rougher than the starting surface shown in FIG. 8A. In contrast, no obvious deterioration is observed in the smoothness of the starting surface, FIG. 8C, of the Li {110} after 300 cycles, FIG. 8D. When the current density is increased to 5 mA/cm², the surface morphology evolution of the Li foils is accelerated over that exhibited at the low current density of 1 mA/cm² for Li {100} samples with significant surface roughening at 50 cycles for Li {100} and continued to deteriorate towards longer cycles), as illustrated in FIGS. 9A, 9C, and 9E. In contrast, surface smoothness was maintained for Li {110} observed at equivalent numbers of cycling), as illustrated in FIGS. 9B, 9D, and 9F.

Figure 10A:
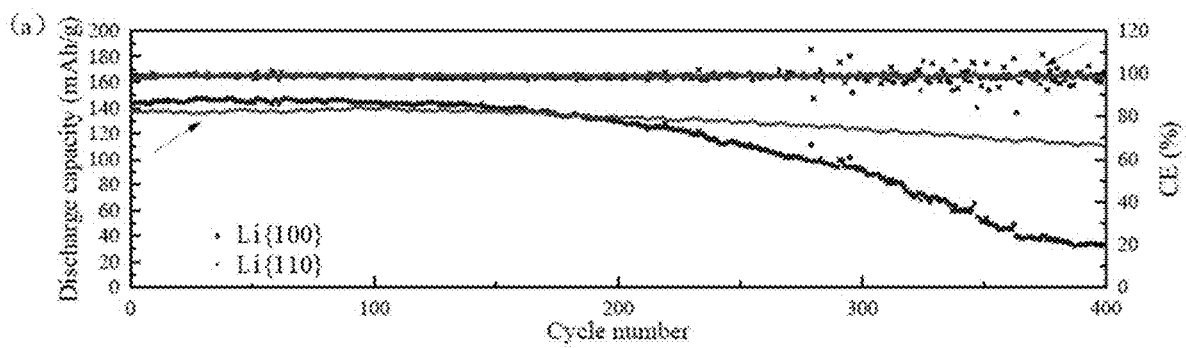
FIG. 10A is a plot of the electrochemical performances of Li//LFP full cells where the cycling performances of the full cells with Li {100} (blue) and {110} (red) anode at 1 C.
Figure 10B:
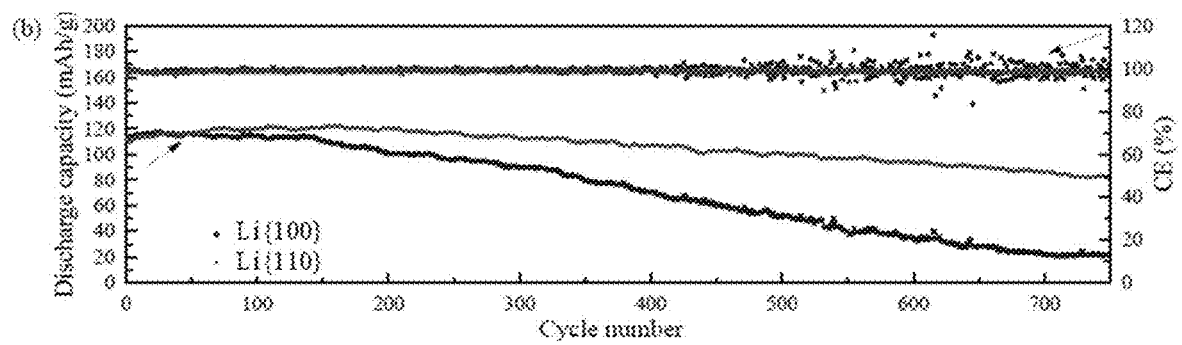
FIG. 10B is a plot of the electrochemical performances of Li//LFP full cells where the cycling performances of the full cells with Li {100} (blue) and (110) (red) anode at 5 C.
Figure 10C:
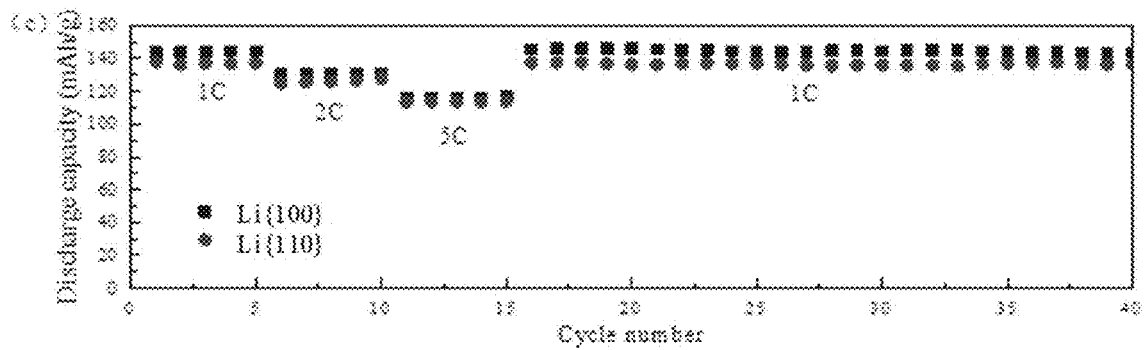
FIG. 10C is a plot of the rate capacity of Li//LFP full cells with Li {100} (blue) and {110} (red) anodes.
Figure 11A:
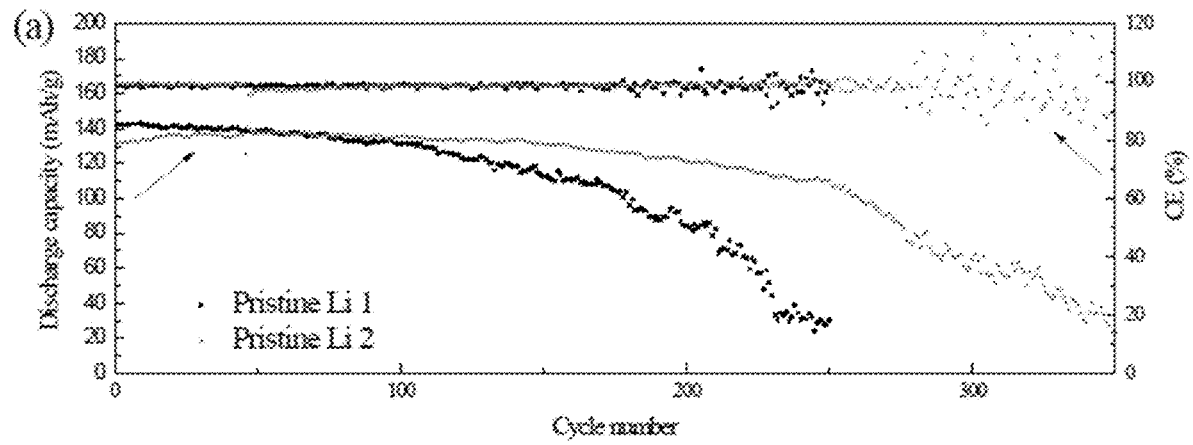
FIG. 11A shows a plot of the electrochemical performances of Li//LFP full cells using the pristine lithium metal anode at 1 C.
Figure 11B:
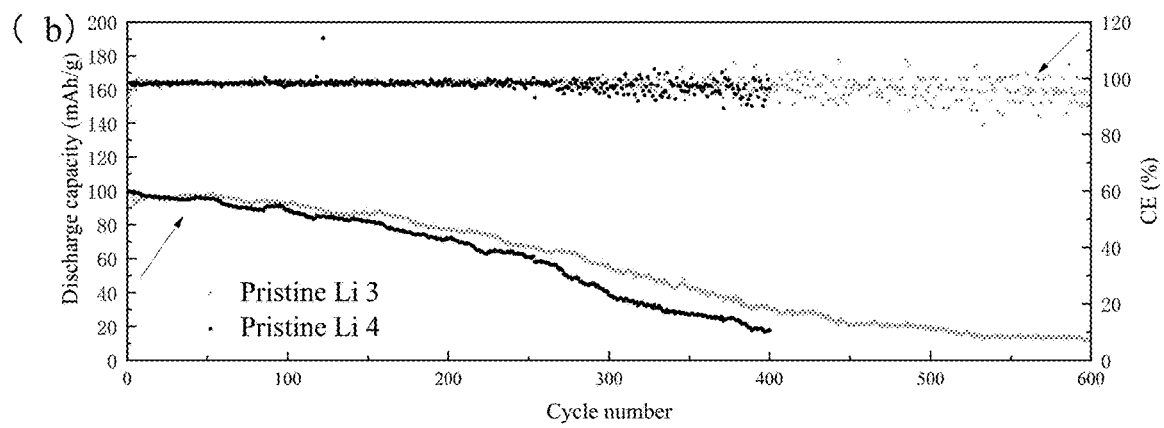
FIG. 11B shows a plot of the electrochemical performances of Li//LFP full cells using the pristine lithium metal anode at 5 C.
Figure 12:
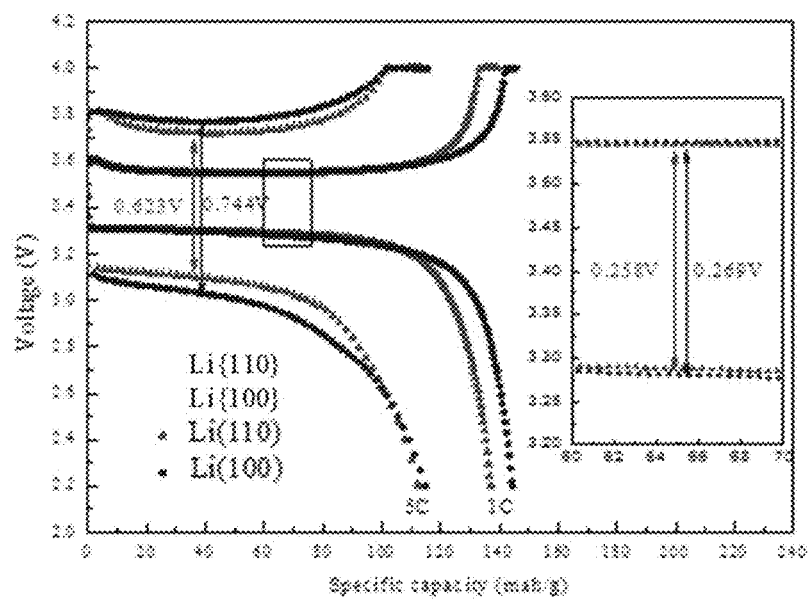
FIG. 12 shows the charge-discharge profiles of the Li//LFP full cells with Li {100} or (110) anode at the 1st cycles at 1 C and 5 C.

Li//LiFePO₄ (Li//LFP) full cells constructed with various Li anode in a full cell configuration display the advantages of the Li {110} surface texturing. After pre-activated at 0.1 C, a full cell with a Li {100} anode reaches a discharge capacity of 143.7 mAh/g with a capacity retention of 23.3% (33.5 mAh/g) after 400 cycles at 1 C, as indicated in FIG. 10A. An otherwise equivalent full cell with a Li {110} anode displays a slightly lower initial discharge capacity of 136.4 mAh/g but shows a significantly improved capacity retention of 81.9% (111.7 mAh/g) after 400 cycles at 1 C, as indicated in FIG. 10A. The Li//LFP full cells with either Li {100} or {110} anode show improved capacity retention when compared to cells constructed with pristine Li foil lacking a preferential surface texturing. The electrochemical performance of the full cell with pristine Li foil anodes varies, for example, though their initial discharge capacity are similar to ~140 mAh/g, a "short-lived" cell, displayed ~20% capacity retention after 250 cycles and a "long-lived" displayed ~20% capacity retention after 350 cycles, as shown in FIG. 11A. When the rate is increased to 5 C, as shown in FIG. 10B, the initial discharging capacity of the exemplary cell with Li {100} anode is 111.5 mAh/g and the capacity retention is 63.3% (70.6 mAh/g) after 400 cycles, and 21.9% (19.9 mAh/g) after 750 cycles and the capacity retention of the cell with Li {110} was 96.6% (106.9 mAh/g) after 400 cycles and 75.9% (82.4 mAh/g) after 750 cycles. Again, this performance of cells made with Li {100} and {110} are much better than full cells made with pristine Li foil anodes that show ~20% capacity retention (19.4 mAh/g) after only 500 cycles, as shown in FIG. 11B. The rate performance of the full cells is shown in FIG. 10C, where the cell with Li {100} anode delivered discharge capacities of 145.2, 130.1, and 115.7 mAh/g at 1, 2 and 5 C, which are slightly higher than that of cells with the Li {110} anode of 138.5, 125.1, and 113.5 mAh/g at 1, 2 and 5 C, respectively. At a lower rate of 1 C, as shown in FIG. 12, the smaller voltage hysteresis of cells with Li {100} and {110} is similar, with that of Li {110} being slightly lower than Li {100}. The difference becomes larger for cells cycled at 5 C (0.623V of Li {110} vs 0.744V of Li {100}).

Hence, in embodiments, Li metal electrode having {110} texturing has a significantly improved cycle stability in devices with symmetrical cell and full cell configurations relative to equivalent Li metal electrode with {100} texturing or without any specific texturing, the pristine Li foils. These cells lack any artificial SEI, yet the Li {110} electrode shows comparable performance to cells with artificial SEI disclosed in the literature. In contrast to electrodes from Li {100} or pristine Li foils, Li metal electrode with {110} texturing maintains the {110} preferential crystallographic orientation and its surface flatness upon repeated cycling even at a large current density of 5 mA/cm². The significantly enhanced cycling performance of Li {110} is exemplified by the uniform stripping and dense plating of Li on the Li {110} surface, due to its low surface energy and surface diffusion barrier.

Figure 26A:
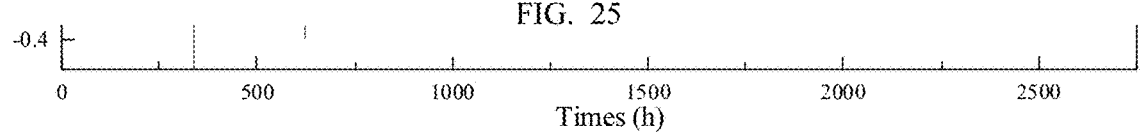
FIGS. 26A and 26B show a potential cycle for Na {100} (black), Na {110} (red) and pristine Na foils (blue) symmetric cells at different current densities of 5 mA/cm² with a capacity of 1 mAh/cm².
Figure 26B:
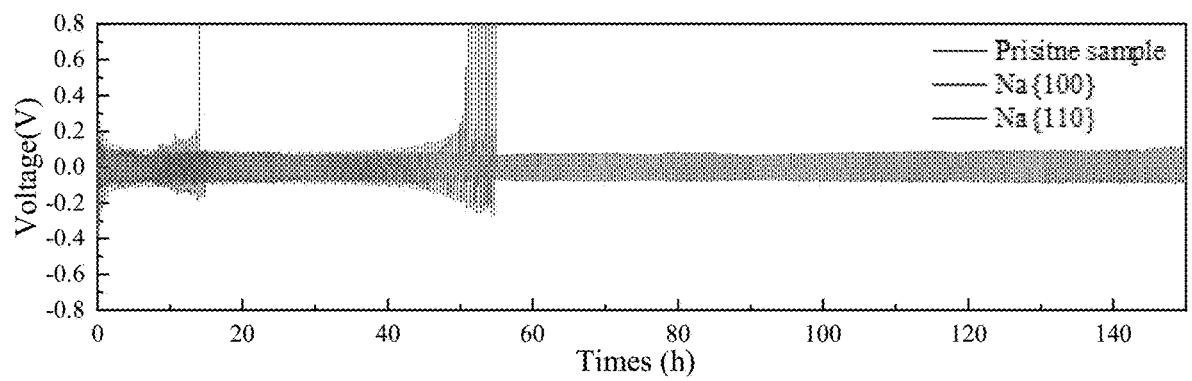

The galvanostatic charge/discharge performances of Na {110} and Na {100}, symmetric cells at a capacity of 1 mAh/cm² and different current densities of 1 mA/cm² and 5 mA/cm² in diethylene glycol dimethyl ether are shown in FIGS. 26A and 26B for exemplary cells. At a current density of 1 mA/cm², the Na {110} electrode can be stable for more than 1200 cycles, while the Na {100} and pristine sodium foil electrodes show fluctuation at about 80 cycles and 200 cycles, respectively. At a current density of 5 mA/cm², the voltage hysteresis of both Na {110} and Na {100} exemplary cells are stable until 150 cycles, where the voltage hysteresis of Na{100} increased rapidly after 170 cycles. In contrast, from the 1st cycle to the 300th cycle, voltage hysteresis of Na {110} was stable at about 100 mV without much fluctuation.

Figure 27:
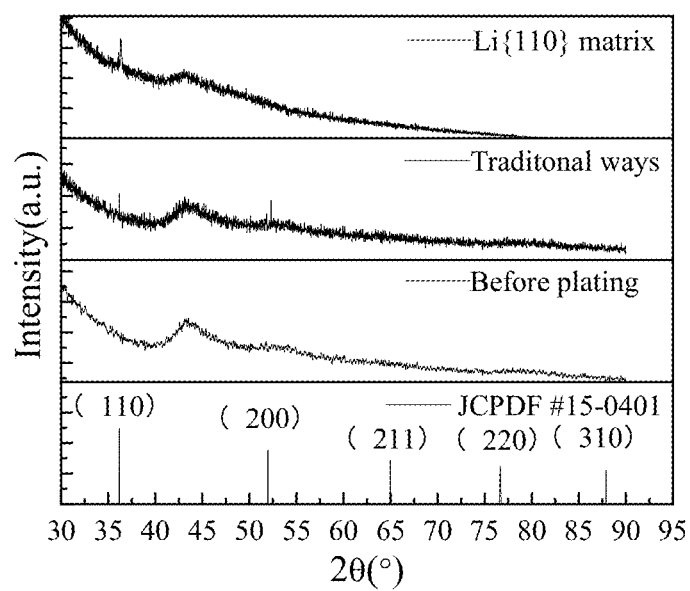
FIG. 27 shows the XRD patterns for 3D current collector with Li {110} matrix and traditional ways.

The prepared Li {110} foil also serves as a substrate for further preparation of Li-based 3D electrode with {110} texture. To prepare such a 3D electrode, Li metal is electroplated onto a 3D template (e.g. carbon cloth) located on the Li {110} substrate. 10 mAh/cm² Li was plated onto the 3D template at a current density of 0.2 mAh/cm² in ether electrolyte. XRD taken from the plated sample shows a dominant (110) diffraction of bcc Li in FIG. 27, suggesting preferential {110} texture of the Li metal that forms a 3D composite structure with the original 3D template (carbon cloth). As a comparison, without the guiding effect of Li {110} foil, such a deposition only results in Li 3D composite without any preferential texture (FIG. 27).

The following are examples that illustrate procedures for practicing the invention. These examples should not be construed as limiting. All percentages are by weight and all solvent mixture proportions are by volume unless otherwise noted.

Materials and Methods

Li foils (China Energy Lithium CO., LTD) were polished using a tetrahydrofuran solution of naphthalene (0.192 g naphthalene crystal (Sigma Aldrich) dissolved in 15 mL of anhydrous tetrahydrofuran) for 2 min. Subsequently, the Li foils were rinsed by DEC three times to remove the polishing chemicals. All procedures were carried out in a glove box with oxygen and water content below 0.5 ppm.
Preparation of Lithium Foil with {110} Surface Texturing To prepare Li foils of {110} surface crystallographic orientation, the pristine Li foil, round with ~600 μm thickness and 16 mm in diameter was first rolled at room temperature (~20° C.) using a stainless-steel shaft to a thickness of ~300 μm. The surface of Li foil was then scraped in a uni-directional manner at 75° C. After that, the lithium foil was further thinned by a second rolling to ~200 μm using the same stainless-steel shaft at 75° C. A 12 mm diameter about 200 μm-thick circle was cut from the center of the oval shaped lithium foil to provide the Li {110} electrode.

Preparation of Lithium Foil with {100} Surface Texturing

To prepare Li foils of {100} surface crystallographic orientation, a pristine Li foil the was pressed at 5 MPa for 5 seconds in a hydraulic press at room temperature. The thickness of the lithium foil was reduced to ~250 μm after the compression with an increase in diameter to about 20 mm. A 12 mm diameter circle was cut from the center of the treated lithium foil to provide the Li {100} electrode.

Cr-2032-type coin cells were assembled to investigate the electrochemical performance of Li or Na foil with specific texturing. Symmetric cells were prepared using lithium or sodium foils with the same surface crystallographic orientation as both electrodes (i.e., {100} with {100} or {110} with {110})).

For lithium electrode, symmetric cells were constructed using 1M lithium hexafluorophosphate (LiPF$_6$) in 1:1 ethylene carbonate (EC)/diethyl carbonate (DEC) and 1M lithium bis(trifluoromethanesulfonyl) imide (LiTFSI) in 1:1 1,3-dioxolane (DOL)/1,2-dimethoxyethane (DME) with 1% LiNO$_3$ as the electrolyte. A series of symmetrical cells were assembled and cycled at current densities of 1 mA/cm$^2$, and 5 mA/cm$^2$ with a capacity of 1 mAh/cm$^2$. At different cycle numbers, the cells were stopped and disassembled. The disassembled electrodes were rinsed by DEC to remove electrolyte. The electrodes from the cells were either sealed with a Kapton film in a glove box for ex-suit XRD experiments of crystallographic evolution, or transferred in a vacuum chamber from the glove box to the scanning electron microscope (SEM) for surface morphology imaging of the Li foils.

For the sodium electrode, symmetric cells were constructed using 1M sodium hexafluorophosphate (NaPF$_6$) in diethylene glycol dimethyl ether (DEGDME) as the electrolyte. Symmetrical cells were assembled and cycled at a current density of 5 mA/cm$^2$ with a capacity of 1 mAh/cm$^2$.

Standard CR2032 coin-type cells were assembled to generate Li//liFePO$_4$ full cells. The electrolyte used for the full cell was 1.0 m LiPF$_6$ in EC/DEC (v/v=1:1) with a 60 μl liquid electrolyte in full cell assemblies. The cathode was prepared by mixing the LiFePO$_4$ active material, carbon black (TIMCAL) and polyvinylidene fluoride (PVDF) at the weight ratio of 8:1:1 in anhydrous n-methyl-2-pyrrolidone (NMP), and casting the resulting slurry on aluminum foil with a LiFePO$_4$ mass loading of about 3.1 mg in the cathode. The full cells were pre-cycled at 0.1 C for three rounds to activate the cathode, and subsequently cycled at 1 C, and 5 C at a voltage range of about 2.2-4.0V verse Li$^+$/Li.

The 3D current collector (carbon based) with {110} texture was prepared by electrochemical plating. A 3D current collector is placed on the Li{110} foil. 10 mAh/cm$^2$ Li was plated in half cells with Li foil as the counter electrode at a current density of 0.2 mAh/cm$^2$ in ether electrolyte. After peeling off the lithium foil, the 3D current collector was washed three times with DOL to remove the electrolyte and then tested by XRD.

Characterizations of Li Foils at Different Preparation Stages Li {100}

Figure 13:
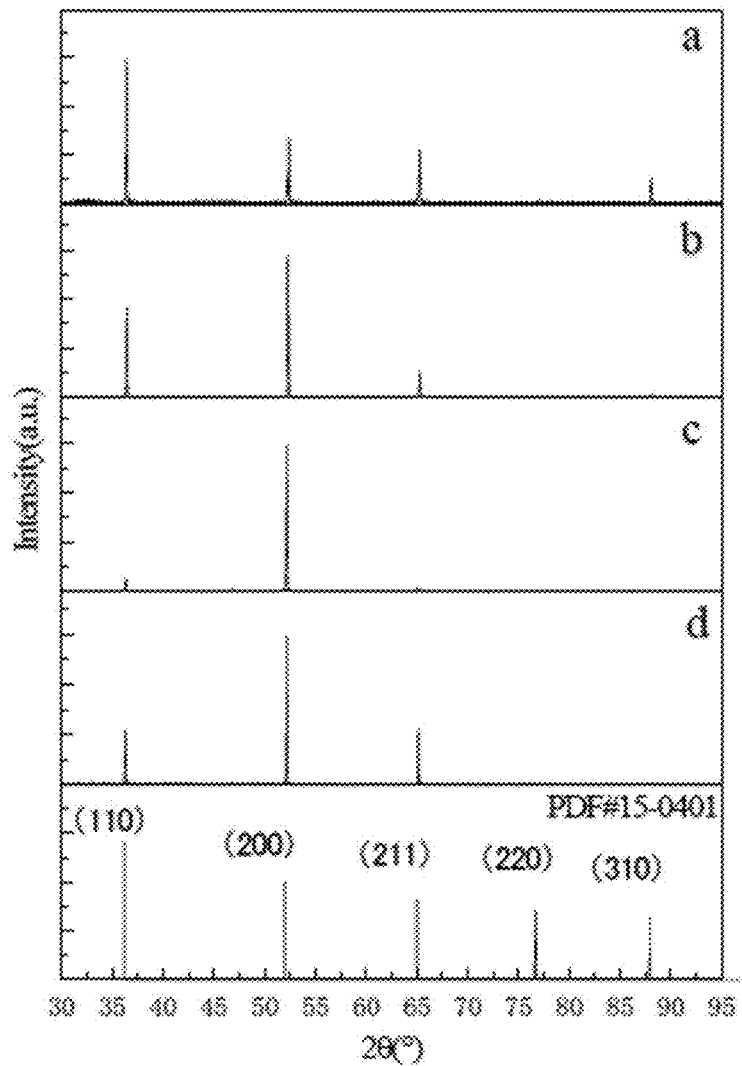
FIG. 13 shows XRD patterns of lithium foils (a) after being chemically polished, and after being pressed at (b) 2.5 MPa, (c) 5.0 MPa, and (d) 6.5 MPa.
Figure 14:
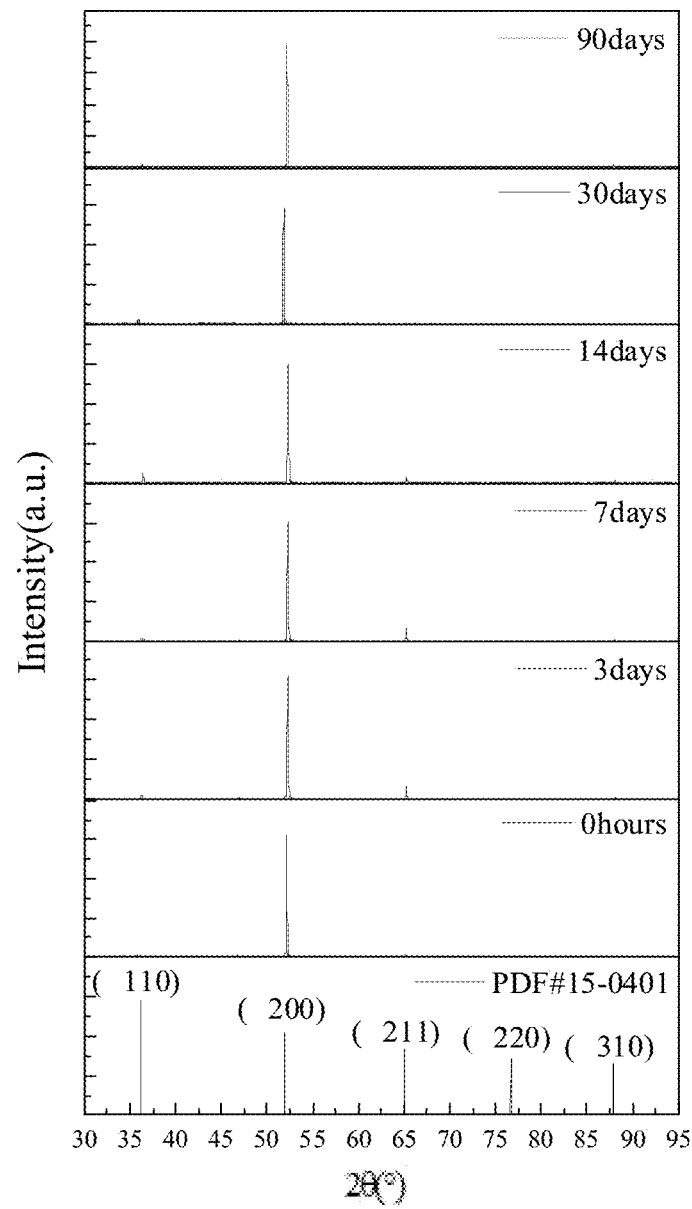
FIG. 14 shows XRD patterns of a representative Li {100} sample after being stored in a glove box at oxygen and water levels are below ~0.5 ppm, and ~0.5 ppm, respectively for different durations.

No preferential surface texturing is observed for most of the polished Li foil samples, as suggested by the multiple diffraction peaks with similar intensities in the x-ray diffraction (FIG. 13, XRD (a)). The relative intensity of the (200) diffraction is found to grow first when the pressure is increased (FIG. 13 XRD (b) and (c)), before reaching its highest level at a pressure of 5 MPa (FIG. 13 XRD (c)). At larger pressures, the relative intensity of the (200) diffraction starts to decrease (FIG. 13 XRD (d)). Therefore, 5.0 MPa is chosen as the loading pressure for the preparation of Li foils of {100} surface texturing (named Li {100}). Little change in the surface texturing was observed of the Li {100} samples when stored in a glove box at room temperature for up to 90 days, as suggested by time-dependent x-ray diffraction is shown in FIG. 14.

Thickness Estimation of Li {100} Surface Texturing

Figure 15:
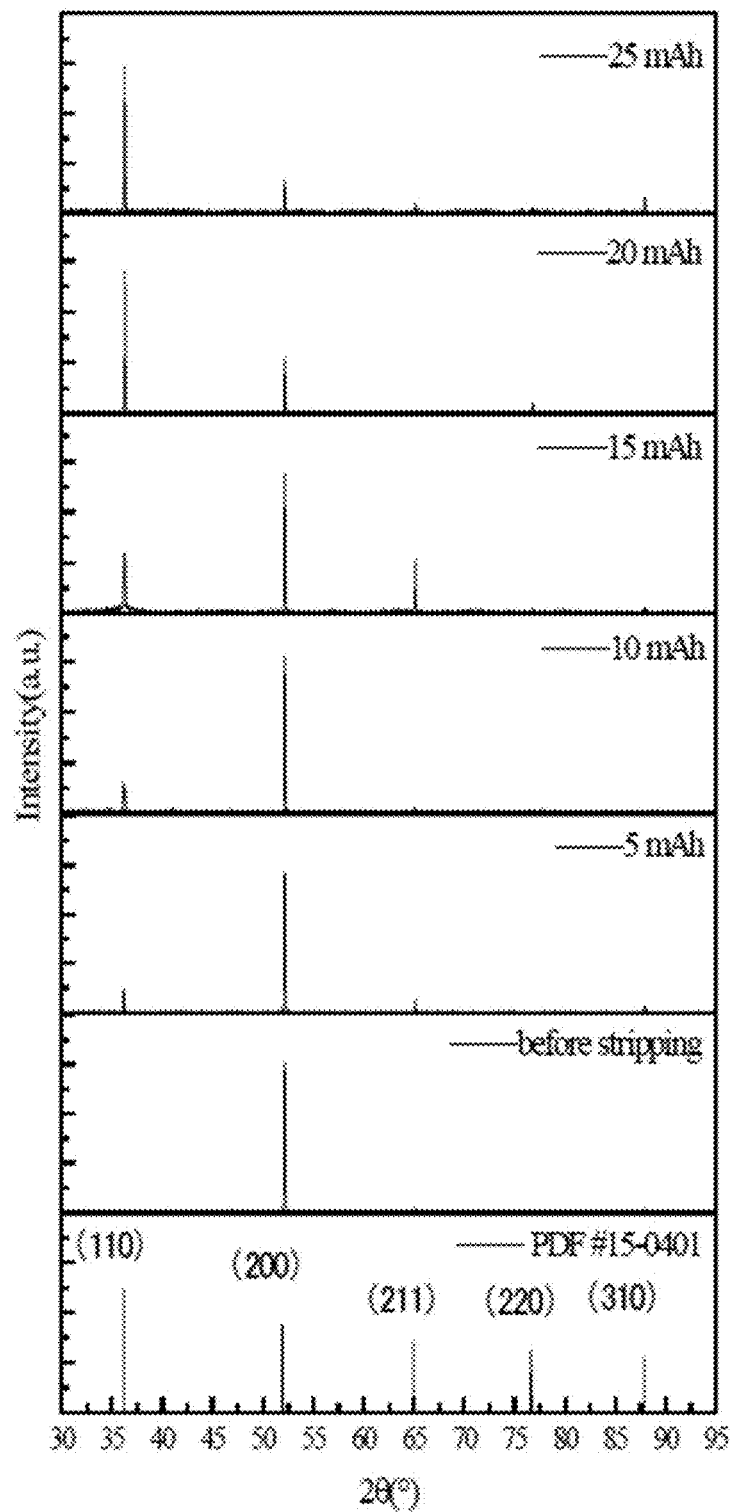
FIG. 15 shows XRD patterns from a Li {100} sample before and after being stripped at a current density of 1 mA/cm² with different capacities.

The 1 mAh stripping capacity corresponds to about 4.85 μm of the {100} lithium layer in the experimental setting. A specific crystallographic orientation (hkl) appears to dominate when the total intensity from all other diffraction planes is less than ⅕ of the (hkl). Assigning this as the standard, the total intensity of all other crystal planes reaches 19.5% of (200) diffraction when the stripping capacity reached 10 mAh, as indicated in FIG. 15. Therefore, the surface texturing of {100} was found to be maintained up to a stripping capacity of 10 mAh, corresponding to a surface texturing layer of ~48.5 μm in thickness.

Li {110}

Figure 16:
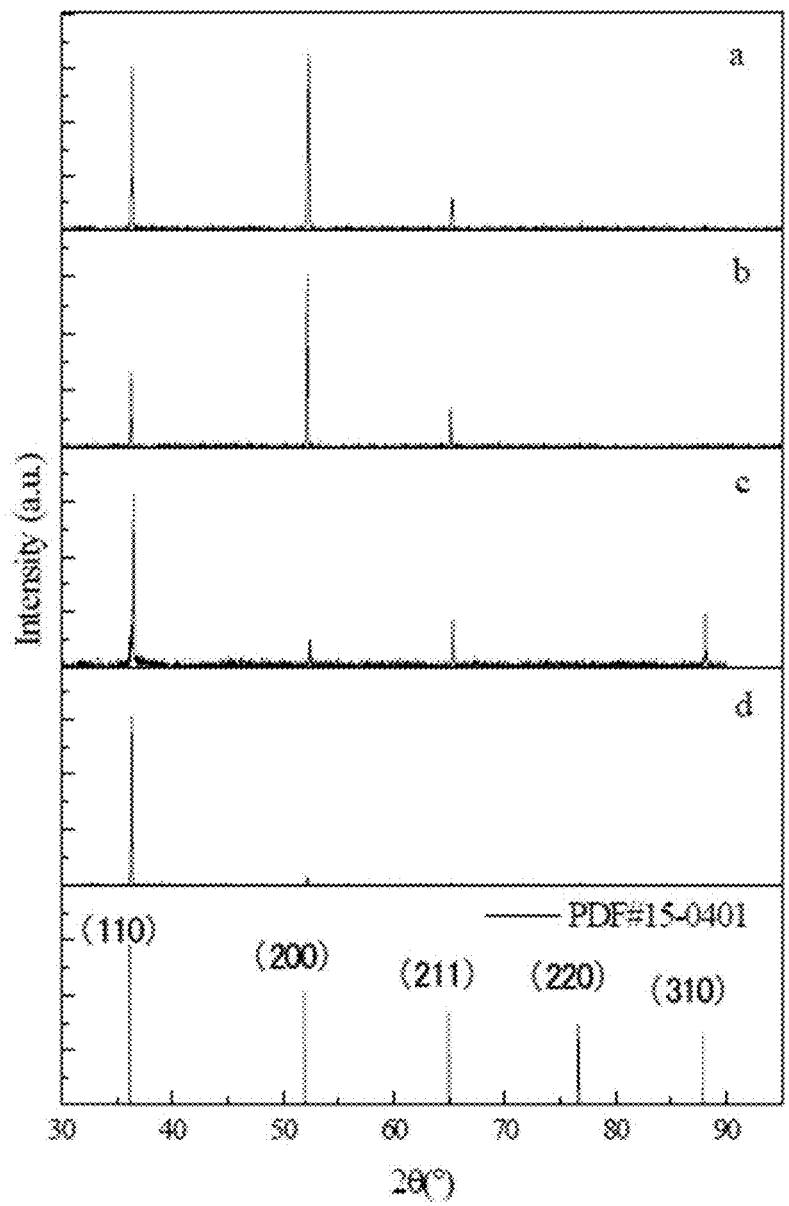
FIG. 16 shows XRD patterns for lithium foils after: being annealed at 90° C. showing randomized surface crystallographic orientation; (b) rolling to 300 μm in thickness at room temperature; (c) being scraped from a ~50 μm surface layer at 75° C.; and (d) after further rolling to ~200 μm in thickness at 75° C.

After annealing, lithium foil (600 μm) shows no obvious texture (FIG. 16 XRD (a)). After first rolling to ~300 μm in thickness at room temperature, the relative intensity of the (200) diffraction increases significantly (FIG. 16 XRD (b)). The lithium foil of 300 μm thickness was scraped by a blade once with a reduction of the thickness of 50 μm). The corresponding X-ray diffraction showed that {110} diffraction became dominant (FIG. 16 XRD (c)). A second rolling to ~200 μm in thickness at 75° C., {110} diffraction became dominant (FIG. 16 XRD (d)), indicating the formation of {110} surface texturing for the Li foil.

Figure 17:
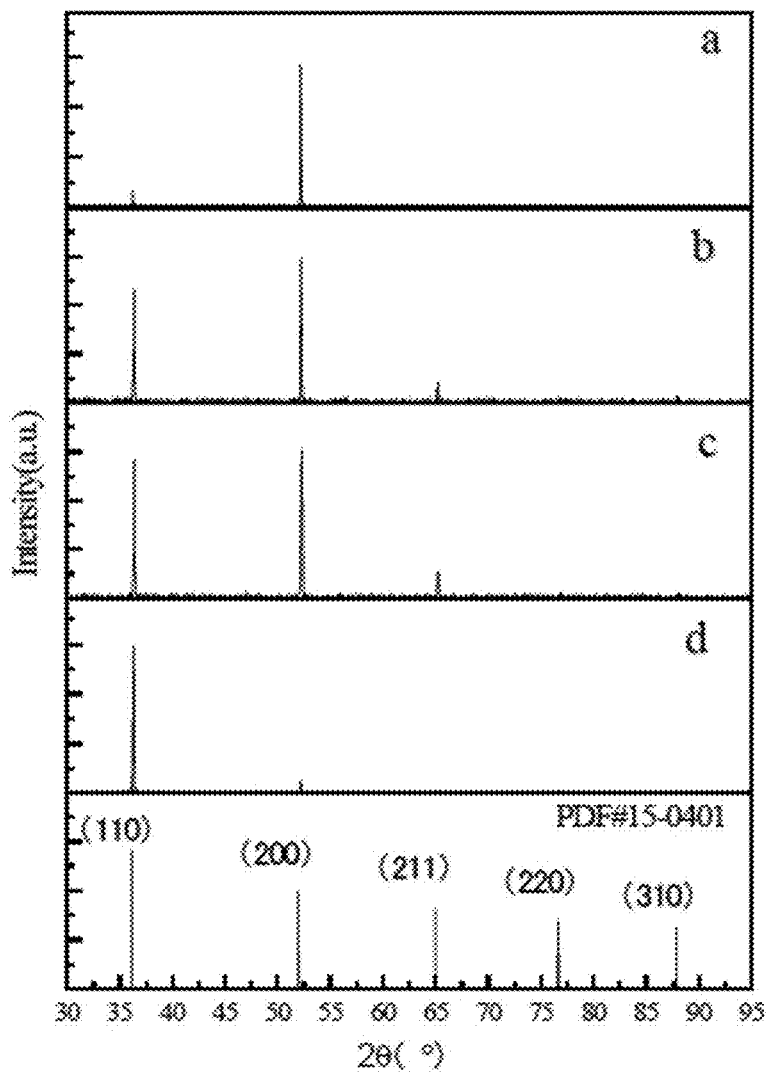
FIG. 17 shows XRD patterns for: (a) a lithium foil with strong (100) texturing; (b) after the (110) surface texturing preparation absent annealing; (c) after annealing to create a randomized surface crystallographic orientation (no pre-existing texturing); and (d) after annealing and the (110) surface texturing preparation.

Effect of Pre-Existing Surface Texturing of the Li Foil on {110} Surface Texturing Formation To determine if pre-existing surface texturing affects the formation of the desired surface texturing a sample having a strong {100} surface texturing (FIG. 17 XRD (a)) was used in the method to produce a Li foil where {110} texturing preparation occurs when annealing of a {100} textured sample randomizes the surface texture (FIG. 17 XRD (c)) to that similar to a non-textured sample (FIG. 17 XRD (b)), which allows the transformation from the pre-existing {100} surface texturing to a {110} surface texturing (FIG. 17 XRD (d)) following the method according to an embodiment.

Figure 18:
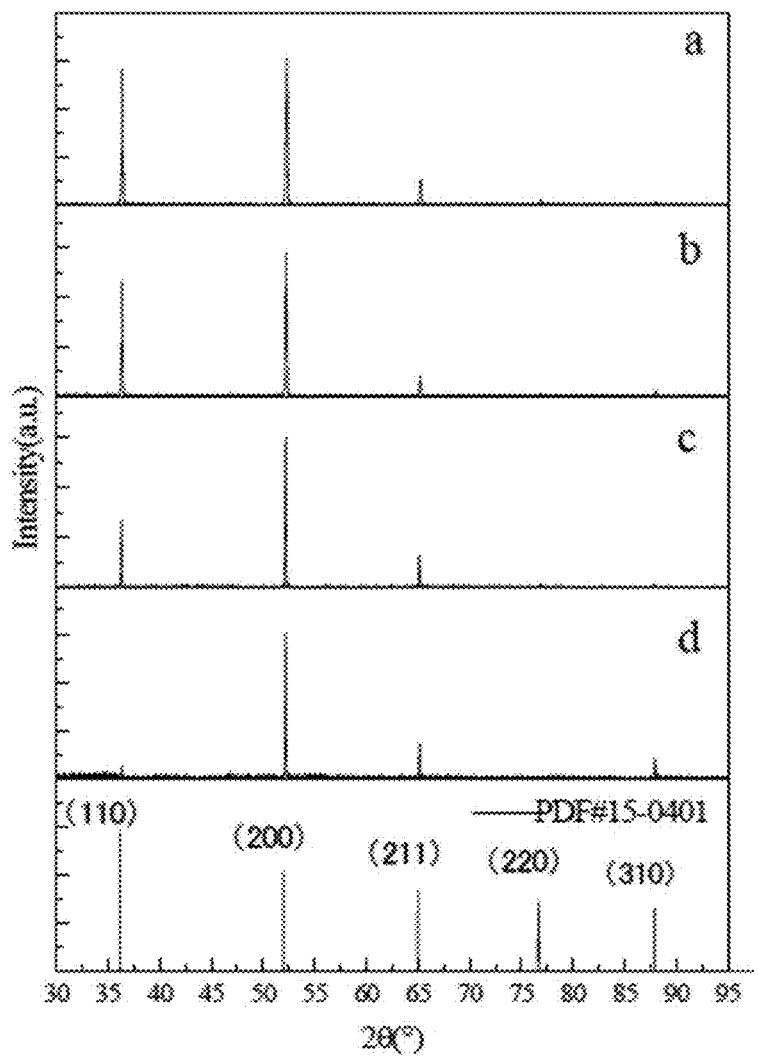
FIG. 18 shows XRD patterns for: (a) a lithium foil after the annealing and after being rolled to (b) 400 μm; (c) 300 μm; and (d) 200 μm thickness.

The effect of the first rolling thickness on the {110} surface texturing formation is indicated in FIG. 18. With no specific surface texturing existing in the annealed lithium foil, a first rolling results in stronger (200) diffraction with a small ending thickness, which is not preferred. Additionally, the mechanical strength of the Li foil decreases with thickness reduction. Therefore, a first rolling thickness of 200 μm is not chosen over thicker films.

Figure 19:
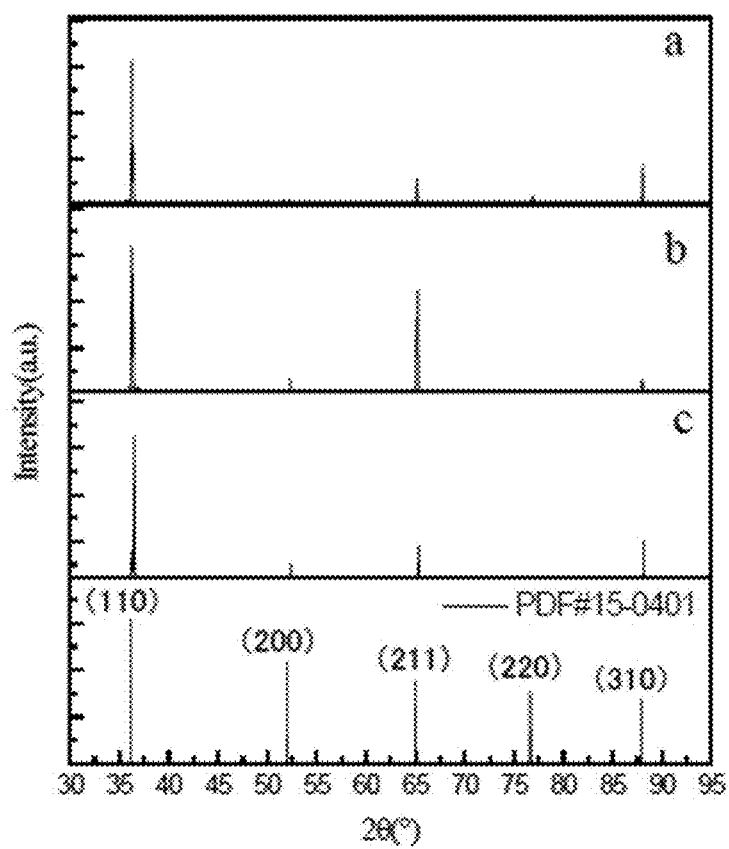
FIG. 19 shows XRD patterns for lithium foil after: (a) annealed before rolling; (b) annealed and rolled to 400 μm before scraping; and (c) annealed and rolled to 300 μm before scraping.

After scraping, as shown in FIG. 19, lithium foils having a thickness of 400 μm and 300 μm showed obvious {110} surface texturing, with the relative intensity of (110) diffraction appearing to be stronger in the 300 μm sample. In both samples, diffractions from other crystalline planes remain visible.

Figure 20:
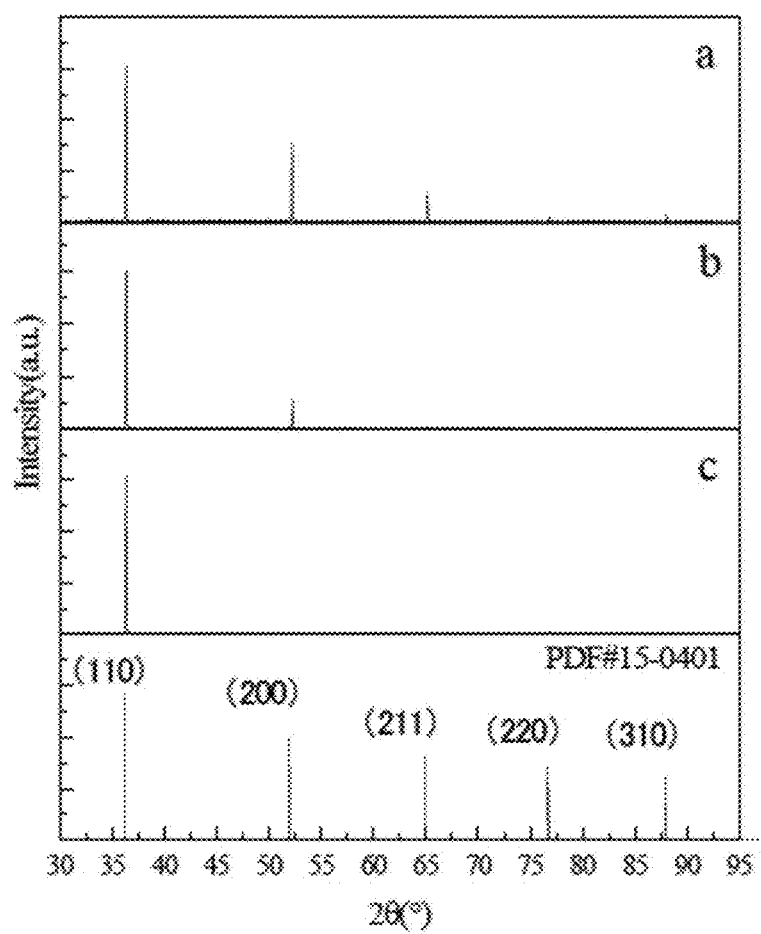
FIG. 20 shows XRD patterns for the corresponding lithium foils before (a) and after the second rolling to (b) 400 μm and (c) 300 μm.

After a second rolling to 200 μm thick at 75° C., as indicated in FIG. 20, the {110} surface texturing was observed from lithium foils of either 400 μm or 300 μm thickness. With the best {110} surface texturing obtained in the lithium foil of 300 μm thickness.

Figure 21:
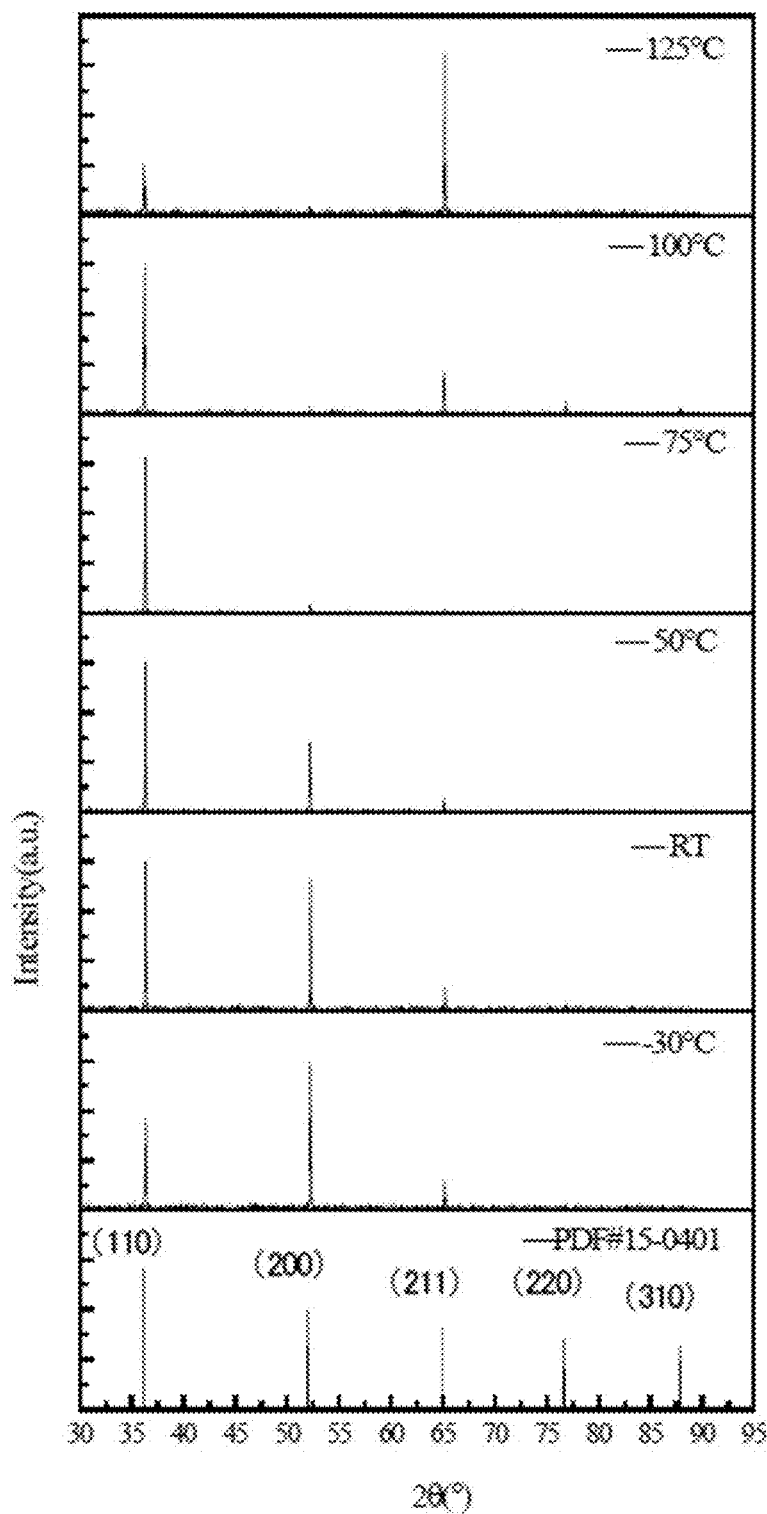
FIG. 21 shows XRD patterns for lithium foil rolled to ~200 μm in thickness at different temperatures.
Figure 22:
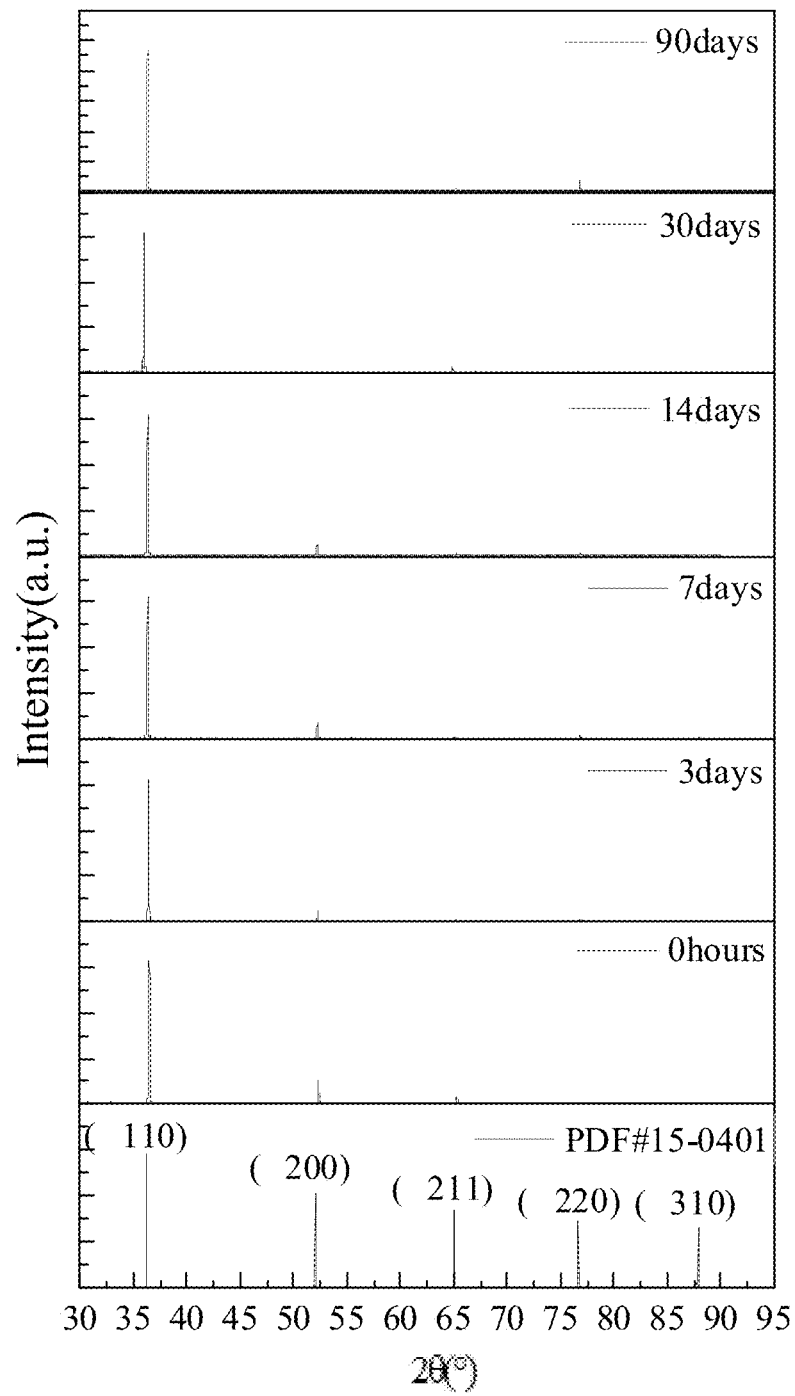
FIG. 22 shows XRD patterns for Li {110} surfaces for a foil after storage for different durations.

Effect of Annealing Temperature During the Second Rolling on the {110} Surface Texturing Formation As shown in FIG. 21, at low temperatures (<50° C.), the relative intensity of the (200) diffraction grows as the temperature decreases. Increasing the temperature results in the rise of (110) diffraction, which becomes dominant at 75° C. Further increase of the temperature above 75° C. leads to the outgrown of (211) diffraction to the (110) diffraction. Therefore, 75° C. appears to be the optimal temperature for annealing during the second rolling. The prepared {110} surface texturing of the Li film was found to be stable for at least 90 days when being stored in a glove box at room temperature, as shown in FIG. 22.

Thickness Estimation of Li { 110} Surface Texturing

Figure 23:
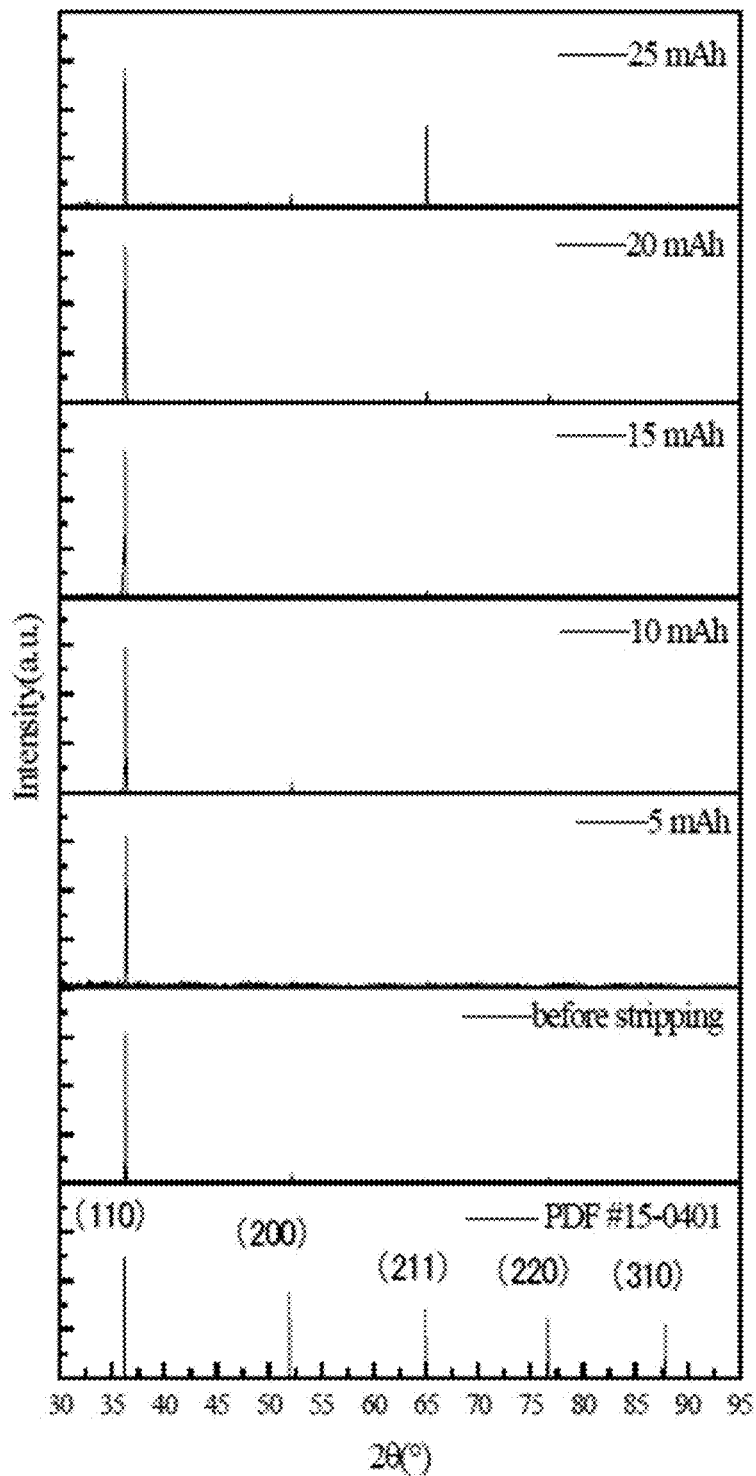
FIG. 23 shows XRD patterns for Li foils of (110) surface texturing after being stripped at a current density of 1 mA/cm² with different capacities.

The 1 mAh stripping capacity corresponds to about 4.85 μm of the lithium layer in the experimental setting. The surface texturing of {110} was found to be maintained up to a stripping capacity of 20 mAh, as shown in FIG. 23, corresponding to a surface texturing layer of about 97 μm in thickness. When the lithium foils are treated on both sides, the texture thickness can reach about 200 μm, which is the thickness of the whole lithium sheet.

Preparation of Sodium Foil with {100} Surface Texturing

Figure 24:
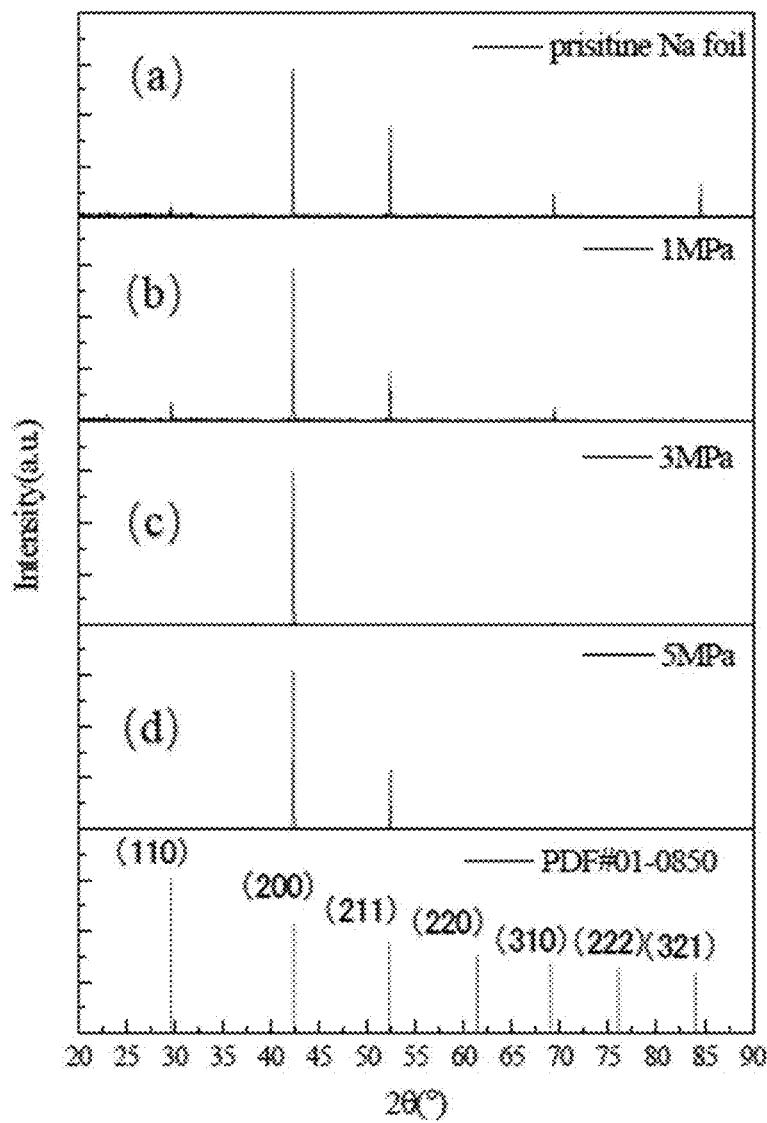
FIG. 24 shows XRD patterns for (a) pristine Na foil; and after being pressed at (b) 1 MPa; (c) 3 MPa; and (d) 5 MPa.

The formation of Na foil with {100} texturing was carried out in a glove box with oxygen and water levels <~0.5 ppm, and ~0.5 ppm, respectively, in an analogous fashion to that for the preparation of lithium foil with {100} texturing. Because the Brinell hardness of sodium (0.69 MPa) is lower than that of lithium (5 MPa), the unidirectional pressure applied to sodium is lower than that of lithium. Hence, a commercial sodium block (Sigma-Aldrich, 15 mm×15 mm×15 mm) was sliced to form a sodium foil with a thickness of 1.5 mm. The sodium foil was placed under a hydraulic press and a unidirectional pressure (P=3 MPa) was applied perpendicular to the surface of the sample. As shown in FIG. 24, this pressure was determined to be optimal. Then the pressure was maintained for a duration of about 5 seconds. Flat round electrodes were cut from the center part of pressed sodium foil with a diameter of ~12 mm.

Preparation of Sodium Foil with {110} Surface Texturing

Figure 25:
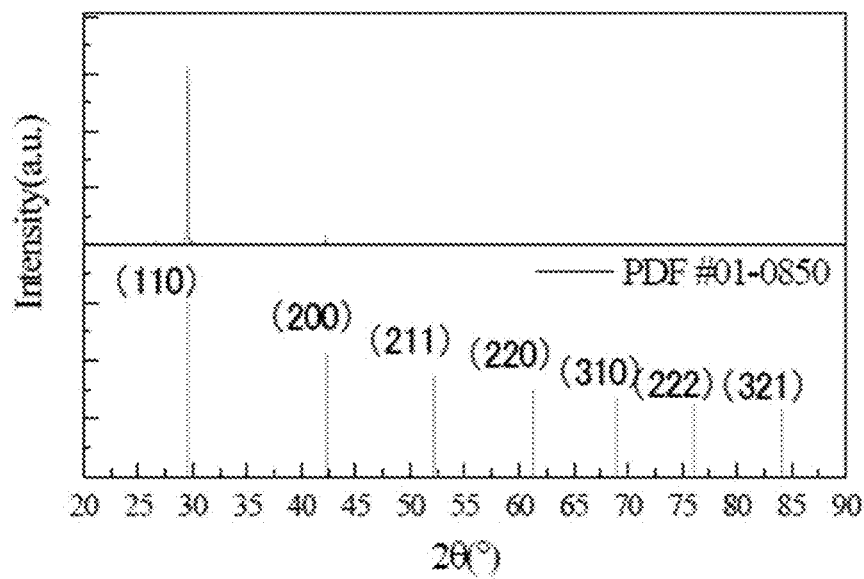
FIG. 25 shows XRD patterns for sodium foil surfaces after treatment to produce Na {110}.

The formation of Na foil with {110} texturing was carried out in a glove box with oxygen and water levels <~0.5 ppm, and ~0.5 ppm, respectively, in an analogous fashion to that for the preparation of lithium foil with {110} texturing. As the temperature of generating lithium {110} is from 50 to 100° C. (70%-80% of lithium's melting point). In this manner, as 70%-80% of sodium's melting point is −13.5° C. to 23.6° C. As a result, the Na foil {110} texture is obtained at room temperature, as indicated in FIG. 25. After generating a Na foil of 1.5 mm, as above, the sodium foil was first rolled at room temperature to about 300 μm in thickness. A surface layer of ~50 μm-thick was scraped using a blade with the scraping direction along with the rolling direction. The sodium foil's second rolling was carried out to 200 μm in thickness at room temperature. The flat round electrodes were cut from the center part of the rolled sodium foil with a diameter of ~12 mm.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Preparation of Li Based 3D Current Collector with {110} Texturing

Employing the prepared Li {110} foil as the substrate, a 3D Li metal electrode with {110} texture can be prepared by Li electroplating onto a carbon cloth (serving as 3D matrix template) that is placed on top of Li {110} foil.

REFERENCES

Li, L. et al., Self-heating-induced healing of lithium dendrites. *Science*, 2018. 359(6383): p. 1513-1516.

Tang, W. et al., Chemically polished lithium metal anode for high energy lithium metal batteries. *Energy Storage Materials*, 2018. 14: p. 289-296.

Coblas, D. G. et al., Manufacturing textured surfaces: State of art and recent developments. *Proceedings of The Institution of Mechanical Engineers, Part J. Journal Of Engineering Tribology*, 2015. 229(1): p. 3-29.

Zheng, J. et al., Textured Electrodes: Manipulating built-in Crystallographic Heterogeneity of Metal Electrodes via Severe Plastic Deformation. *Advanced Materials*, 2021.2106867.

Gu, Y. et al., Lithiophilic Faceted Cu (100) Surfaces: High Utilization of Host Surface and Cavities for Lithium Metal Anodes. *Angewandte Chemie International Edition*, 2019. 58(10): p. 3092-3096.

Li, Y. et al., Atomic structure of sensitive battery materials and interfaces revealed by cryo-electron microscopy. *Science*, 2017. 358(6362): p. 506-510.

Zhao, Q. et al., On the crystallography and reversibility of lithium electrodeposits at ultrahigh capacity. *Nature Communications*, 2021, 12(1), 1-10.

Shi, F. et al., Strong texturing of lithium metal in batteries. *Proceedings of the National Academy of Sciences*, 2017. 114(46): p. 12138-12143.

Hagopian, A. et al., Thermodynamic origin of dendrite growth in metal anode batteries. *Energy Environ. Sci.* 2020, 13: p. 5186-5197

Zaghib, K. et al., Relationship between local structure and electrochemical performance of LiFePO$_4$ in Li-ion batteries[J]. *Ionics*, 2008, 14(4): p. 271-278.

Luning, W. et al., Identifying the components of the solid-electrolyte interphase in Li-ion batteries. Nature Chemistry 2019, 11, 789-796

Guo, W. et al., Mixed Ion and Electron-Conducting Scaffolds for High-Rate. *Adv. Energy Mater.* 2019, 9, 1900193

Qin, L. et al. The role of mechanical pressure on dendritic surface toward stable lithium metal anode. *Nano Energy* 2020, 77, 105098

Jens, B. et al., Lithium-Metal Foil Surface Modification: An Effective Method to Improve the Cycling Performance of Lithium-Metal Batteries. *Adv. Mater. Interfaces* 2017, 4, 1700166

Gu, Y. et al., Designable ultra-smooth ultra-thin solid-electrolyte interphases of three alkali metal anodes. *Nature Communication* 2018, 9, 1339

Zheng, G. et al., Additives synergy for s table interface formation on rechargeable lithium metal anodes. *Energy Storage Materials,* 2020, 29: p. 377-385.

Zhang, P. et al., Influence of current density on graphite anode failure in lithium-ion batteries[J]. *Journal of The Electrochemical Society,* 2019, 166(3): A5489.

Jiao, S. et al., Behavior of lithium metal anodes under various capacity utilization and high current density in lithium metal batteries[J]. *Joule,* 2018, 2(1): 110-124.

Shen, X. et al., Lithium anode stable in air for low-cost fabrication of a dendrite-free lithium battery[J]. *Nature Communications,* 2019, 10(1): 1-9.

Yu, L. et al., A localized high-concentration electrolyte with optimized solvents and lithium difluoro (oxalate) borate additive for stable lithium metal batteries[J]. *ACS Energy Letters,* 2018, 3(9): 2059-2067.

Gireaud, L. et al., Lithium metal stripping/plating mechanisms studies: A metallurgical approach. *Electrochemistry Communications,* 2006, 8(10), p. 1639-1649.

Gehrmann, G. et al., Texture effects on plastic deformation of magnesium. *Materials Science and Engineering A* 395 (2005) 338-349

Liu, D. et al., Improving single pass reduction during cold rolling by controlling initial texture of AZ31 magnesium alloy sheet. *Transactions of Nonferrous Metals Society of China* 28.2 (2018): 244-250.

Hayakawa, Y. et al., A new model of Goss texture development during secondary recrystallization of electrical steel. *Acta Materialia* 45.11 (1997): 4713-4720

We claim:

1. A method of forming an alkali metal electrode consisting essentially of a {110} surface texturing, comprising:
   providing an alkali metal foil;
   first annealing the alkali metal foil at a first temperature of about 70 to 90 percent of a melting point of the alkali metal foil for 1 to 3 hours;
   optionally first cooling the alkali metal foil to room temperature, wherein the alkali metal foil has a randomized surface crystallographic orientation;
   washing the chemical polishing solution with a solvent for the chemical polishing solution;
   first rolling the alkali metal foil to about 300 µm at room temperature;
   scraping a surface layer of about 50 µm in thickness from the alkali metal foil at a temperature of about 70 to about 90 percent of the melting point of the alkali metal foil, wherein scraping is along a same axis as the first rolling;
   second annealing the alkali metal foil at a second annealing temperature of about 70 percent of the melting point of the alkali metal foil for about 0.5 hours;
   second rolling the alkali metal foil at the second annealing temperature to about 200 µm in thickness;
   optionally second cooling the alkali metal foil to room temperature; and
   cutting the alkali metal foil to a shape of an electrode, wherein the alkali metal electrode consists essentially of a {110} surface texturing.

2. The method according to claim 1, wherein the alkali metal is lithium, the first annealing temperature is about 90° C., scraping temperature is about 75° C., and the second annealing temperature is about 75° C.

3. The method according to claim 1, wherein the alkali metal is sodium, the first annealing temperature is about room temperature, and the second annealing temperature is about room temperature.

4. The method according to claim 1, wherein the solvent is diethyl carbonate (DEC).

5. The method according to claim 1, wherein the shape is round.

6. The method according to claim 1, wherein all dimensions of the provided alkali metal foil are larger than all dimensions of the alkali metal electrode.

7. A method of forming an alkali metal electrode consisting essentially of a {100} surface texturing, comprising:
   providing an alkali metal foil with a thickness greater than 250 µm;
   pressing the alkali metal foil to a thickness of about less than 250 µm; and
   cutting the alkali metal foil to a shape of an electrode, wherein the alkali metal electrode consists essentially of a {100} surface texturing, wherein the alkali metal is sodium and the pressure of pressing is 3 MPa.

* * * * *